(12) United States Patent
Shu et al.

(10) Patent No.: US 12,554,770 B2
(45) Date of Patent: Feb. 17, 2026

(54) IMAGE SEARCH METHOD AND RELATED APPARATUS

(71) Applicant: Huawei Technologies Co., Ltd., Shenzhen (CN)

(72) Inventors: Lei Shu, Nanjing (CN); Long Yin, Shenzhen (CN); Peijing Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/835,224

(22) PCT Filed: Feb. 13, 2023

(86) PCT No.: PCT/CN2023/075607
§ 371 (c)(1),
(2) Date: Aug. 1, 2024

(87) PCT Pub. No.: WO2023/155746
PCT Pub. Date: Aug. 24, 2023

(65) Prior Publication Data
US 2025/0165523 A1 May 22, 2025

(30) Foreign Application Priority Data
Feb. 16, 2022 (CN) .......................... 202210143564.5

(51) Int. Cl.
*G06F 16/538* (2019.01)
*G06F 3/0483* (2013.01)
(Continued)

(52) U.S. Cl.
CPC .......... *G06F 16/538* (2019.01); *G06F 3/0483* (2013.01); *G06F 3/0484* (2013.01); *G06F 16/535* (2019.01)

(58) Field of Classification Search
CPC .... G06F 16/538; G06F 3/0483; G06F 3/0484; G06F 16/535; G06F 16/53; G06F 16/54; G06F 16/58; G06F 16/953; G06F 16/957
See application file for complete search history.

(56) References Cited

U.S. PATENT DOCUMENTS 6,466,237 B1 10/2002 Miyao et al.
9,092,458 B1 * 7/2015 Perona .................. G06F 16/583
(Continued)

FOREIGN PATENT DOCUMENTS

CN 107451194 A 12/2017

*Primary Examiner* — Angelica Ruiz
(74) *Attorney, Agent, or Firm* — Conley Rose, P.C.

(57) ABSTRACT

An image search method includes an electronic device that receives a search instruction, where the search instruction indicates the electronic device to search for an index term. The electronic device displays a search result page for the index term, where the search result page includes a first view component, and a first thumbnail is displayed in the first view component. The electronic device switches the first thumbnail displayed in the first view component to a second thumbnail when receiving an image switching instruction for the first view component, where both an original image corresponding to the first thumbnail and an original image corresponding to the second thumbnail are from a first web page.

20 Claims, 14 Drawing Sheets

(51) Int. Cl.
  *G06F 3/0484* (2022.01)
  *G06F 16/535* (2019.01)

(56) References Cited

U.S. PATENT DOCUMENTS

| | | | |
|---|---|---|---|
| 9,619,485 B2* | 4/2017 | Yamamoto | G06F 16/50 |
| 10,185,769 B2 | 1/2019 | Tseng | |
| 10,353,947 B2* | 7/2019 | Soni | G06F 16/243 |
| 2002/0047856 A1 | 4/2002 | Baker | |
| 2006/0064411 A1* | 3/2006 | Gross | G06F 16/9535 |
| 2012/0317097 A1 | 12/2012 | Tseng | |
| 2015/0100561 A1* | 4/2015 | Li | G06F 16/43 |
| | | | 707/706 |
| 2018/0095653 A1* | 4/2018 | Hasek | G06F 3/04883 |
| 2022/0091736 A1* | 3/2022 | Dong | G06F 3/017 |
| 2022/0335094 A1* | 10/2022 | Yang | G06F 16/904 |

\* cited by examiner

IMAGE SEARCH METHOD AND RELATED APPARATUS

CROSS-REFERENCE TO RELATED APPLICATIONS

This is a National Stage of International Patent Application No. PCT/CN2023/075607 filed on Feb. 13, 2023, which claims priority to Chinese Patent Application No. 202210143564.5 filed on Feb. 16, 2022. Both of the aforementioned applications are hereby incorporated by reference in their entireties.

TECHNICAL FIELD

This application relates to the field of electronic technologies, and in particular, to an image search method and a related apparatus.

BACKGROUND

Image search is a very common function on an electronic device. The electronic device may provide a user with related image materials on an internet or a database. Images on web pages and images stored on the database of the electronic device are images that can be found. In some application scenarios, the user may enter a keyword in an image search engine carried on the electronic device. The image search engine may extract a related image from the web pages or the database, and the electronic device outputs a result page including an image collection related to the keyword.

Currently, an image search result page usually displays images on a web page in a tiled manner. The images are related to a search term but lack association with each other. Therefore, how to provide a more associated image on the image search result page is a problem being studied by a person skilled in the art.

SUMMARY

Embodiments of this application provide an image search method and a related apparatus, so that a more associated image may be provided on an image search result page. This improves image search efficiency.

According to a first aspect, this application provides an image search method. The method includes: An electronic device receives a search instruction, where the search instruction indicates the electronic device to search for an index term. The electronic device displays a search result page for the index term in response to the search instruction, where the search result page includes a first view component, and a first thumbnail is displayed in the first view component. The electronic device switches the first thumbnail displayed in the first view component to a second thumbnail when receiving a first switching instruction, where the first switching instruction acts on the first view component, and both an original image corresponding to the first thumbnail and an original image corresponding to the second thumbnail are from a first web page.

In this embodiment of this application, the electronic device needs to analyze a large quantity of web pages, extract and determine index data of a related image on a web page, and establish an index file. Based on correlation between an image and a text included on the web page, image quality, an image aesthetic feature, and the like, the electronic device extracts some or all images on the web page as an image collection of the web page, and determines a text summary of each image in the image collection. The electronic device generates index data of the web page based on the images, the text summaries, and the like extracted from the web page. When receiving an index term entered by a user, and retrieving that the index term is related to the index data of the web page, the electronic device displays, on the search result page, an image collection corresponding to the piece of index data, that is, the user may view all images related to the index term on the web page. In this way, in a manner in which the electronic device displays images on a single web page in a form of an image collection on the search result page, association and storytelling between images on a source web page of the image collection are maintained, and search experience of the user is improved.

In a possible implementation, the first view component includes an image collection identifier, and the image collection identifier indicates that the first view component is used to display at least two thumbnails. Optionally, the first view component includes a next image control and a previous image control that are used to switch to view another image. Optionally, the user may slide leftward or rightward in a display area of the first view component, to switch to view a next image or a previous image.

In a possible implementation, the search result page further includes a second view component, and the second view component is used to display one thumbnail.

In a possible implementation, the method further includes: The electronic device detects that dwell time on the search result page exceeds a first threshold, or detects that continuous display time of the first thumbnail exceeds a first threshold; and the electronic device switches the first thumbnail displayed in the first view component to the second thumbnail. Optionally, the electronic device displays the second thumbnail in the first view component. When detecting that the dwell time of the search result page reaches the first threshold, the electronic device switches the second thumbnail that is being displayed in the first view component to a third thumbnail. Optionally, if the second thumbnail is a last image in first index data, when detecting that the dwell time of the search result page reaches the first threshold, the electronic device switches the second thumbnail that is being displayed in the first view component to the first thumbnail, and sequentially and cyclically performs switching.

In a possible implementation, the method further includes: The electronic device receives a user operation for the first thumbnail; and the electronic device displays a details page of the first thumbnail in response to the user operation, where the details page of the first thumbnail includes the original image corresponding to the first thumbnail and a text summary.

In a possible implementation, the text summary is determined and extracted by the electronic device from text content on the first web page based on image-text correlation analysis. The text summary may be a feature description obtained by the electronic device through image recognition on an image, or may be a text description that is related to an image and that is determined by the electronic device from a text description included on a source web page of the image, or may be a text description that is related to an image and that is determined by the electronic device with reference to an image feature of the image and a text on a source web page.

In a possible implementation, the method further includes: The electronic device receives a second switching instruction, where the second switching instruction acts on the details page of the first thumbnail; and the electronic device displays a details page of the second thumbnail in response to the image switching instruction.

In a possible implementation, before the electronic device receives the index term, the method further includes: The electronic device performs web page analysis on the first web page, and extracts at least two images that meet a preset condition from images on the first web page; and the electronic device determines first index data of the first web page, where the first index data includes related data of the at least two images, and thumbnails of two images in the at least two images are respectively the first thumbnail and the second thumbnail.

In a possible implementation, the index term is related to first index data, and that the electronic device displays a search result page for the index term in response to the search instruction includes: The electronic device obtains a first message from a server in response to the search instruction, where the first message includes the first index data, the first index data is obtained by the server through web page analysis on the first web page, the first index data includes related data of at least two images that are extracted from the first web page and that meet a preset condition, and thumbnails of two images in the at least two images are respectively the first thumbnail and the second thumbnail; and the electronic device displays the search result page for the index term, where the search result page includes the first view component, and display content of the first view component corresponds to the first index data.

In a possible implementation, a quantity of images on the first web page is greater than a quantity of images that are in the first index data and that are used for display. In other words, not all images on a web page are extracted as index data. The electronic device 100 needs to perform selective extraction in full combination with image quality/aesthetic evaluation, image correlation analysis, and the like. In this way, image quality may be improved, and the search experience of the user is improved.

In a possible implementation, the preset condition includes: an image quality score of an image is greater than a second threshold; an image aesthetic score of the image is greater than a third threshold; and/or image-text feature correlation of the image is greater than a fourth threshold.

In a possible implementation, a scoring weight of an image aesthetic scoring algorithm is associated with a scenario type of the image. For example, an image scenario feature is a Danxia landform, and a weight of a color brightness degree and a terrain hierarchy may be increased or added to an aesthetic scoring rule or a quality scoring rule; an image scenario feature is a road, and a weight of a proportion of water, an island, and a sky may be increased or added to an aesthetic scoring rule or a quality scoring rule; or an image scenario feature is an elevated road, and a weight of a light brightness degree and a proportion of a sky and a tall building may be increased or added to an aesthetic scoring rule or a quality scoring rule. In this way, the aesthetic scoring rule or the quality scoring rule is customized based on accurate scenario classification, so that quality of a selected image can be improved in a targeted manner, and user experience is improved.

In a possible implementation, the first index data includes one or more pieces of the following data: a web page address of the first web page, a web page title of the first web page, addresses, on the first web page, of the extracted at least two images that meet the preset condition, thumbnail addresses of the at least two images, identities of the at least two images, and text summaries of the at least two images.

According to a second aspect, this application provides an electronic device. The electronic device includes one or more processors and one or more memories. The one or more memories are coupled to the one or more processors. The one or more memories are configured to store computer program code, and the computer program code includes computer instructions. When the computer instructions are run on the processor, the electronic device is enabled to perform the image search method according to any possible implementation of any one of the foregoing aspects.

According to a third aspect, this application provides a server. The server includes one or more processors and one or more memories. The one or more memories are coupled to the one or more processors. The one or more memories are configured to store computer program code, and the computer program code includes computer instructions. When the computer instructions are run on the processor, the electronic device is enabled to perform the image search method according to any possible implementation of any one of the foregoing aspects.

According to a fourth aspect, an embodiment of this application provides a computer storage medium. The computer storage medium includes computer instructions; and when the computer instructions are run on an electronic device, a communication apparatus is enabled to perform the image search method according to any possible implementation of any one of the foregoing aspects.

According to a fifth aspect, an embodiment of this application provides a computer program product. When the computer program product runs on a computer, the computer is enabled to perform the image search method according to any possible implementation of any one of the foregoing aspects.

DESCRIPTION OF EMBODIMENTS

The following describes technical solutions in embodiments of this application with reference to accompanying drawings. In descriptions of embodiments of this application, "/" means "or" unless otherwise specified. For example, A/B may represent A or B. In the text, "and/or" describes only an association relationship for describing associated objects and represents that three relationships may exist. For example, A and/or B may represent the following three cases: Only A exists, both A and B exist, and only B exists. In addition, in the descriptions of embodiments of this application, "a plurality of" means two or more.

The following terms "first" and "second" are only intended for a purpose of description, and should not be understood as an indication or implication of relative importance or implicit indication of a quantity of indicated technical features. Therefore, a feature limited by "first" or "second" may explicitly or implicitly include one or more features. In the descriptions of embodiments of this application, unless otherwise specified, "a plurality of" means two or more than two. The terms "middle", "left", "right", "upper", "lower", and the like indicate an orientation or a location relationship based on orientations or location relationships shown in the accompanying drawings, and are merely intended for ease of describing this application and simplifying descriptions, instead of indicating or implying that a specified apparatus or element needs to have a specific orientation, and be constructed and operated in the specific orientation. Therefore, this cannot be understood as a limitation on this application.

An electronic device in embodiments of this application may be a mobile phone, a tablet computer, a desktop, a laptop, a notebook computer, an ultra-mobile personal computer (Ultra-mobile Personal Computer, UMPC), a handheld computer, a netbook, a personal digital assistant (Personal Digital Assistant, PDA), a virtual reality device, a PDA (Personal Digital Assistant, personal digital assistant, also referred to as a palmtop computer), a portable internet device, a data storage device, a wearable device (for example, a wireless headset, a smart watch, a smart band, smart glasses, a head-mounted display (Head-mounted display, HMD), electronic clothing, an electronic bracelet, an electronic necklace, an electronic accessory, an electronic tattoo, and a smart mirror), in-vehicle infotainment, a vehicle-mounted terminal (for example, a smart screen, a vehicle-mounted camera, or a display), a camera, and various electronic devices with a camera, or the like.

The following first describes an electronic device 100 in embodiments of this application.

Figure 1:
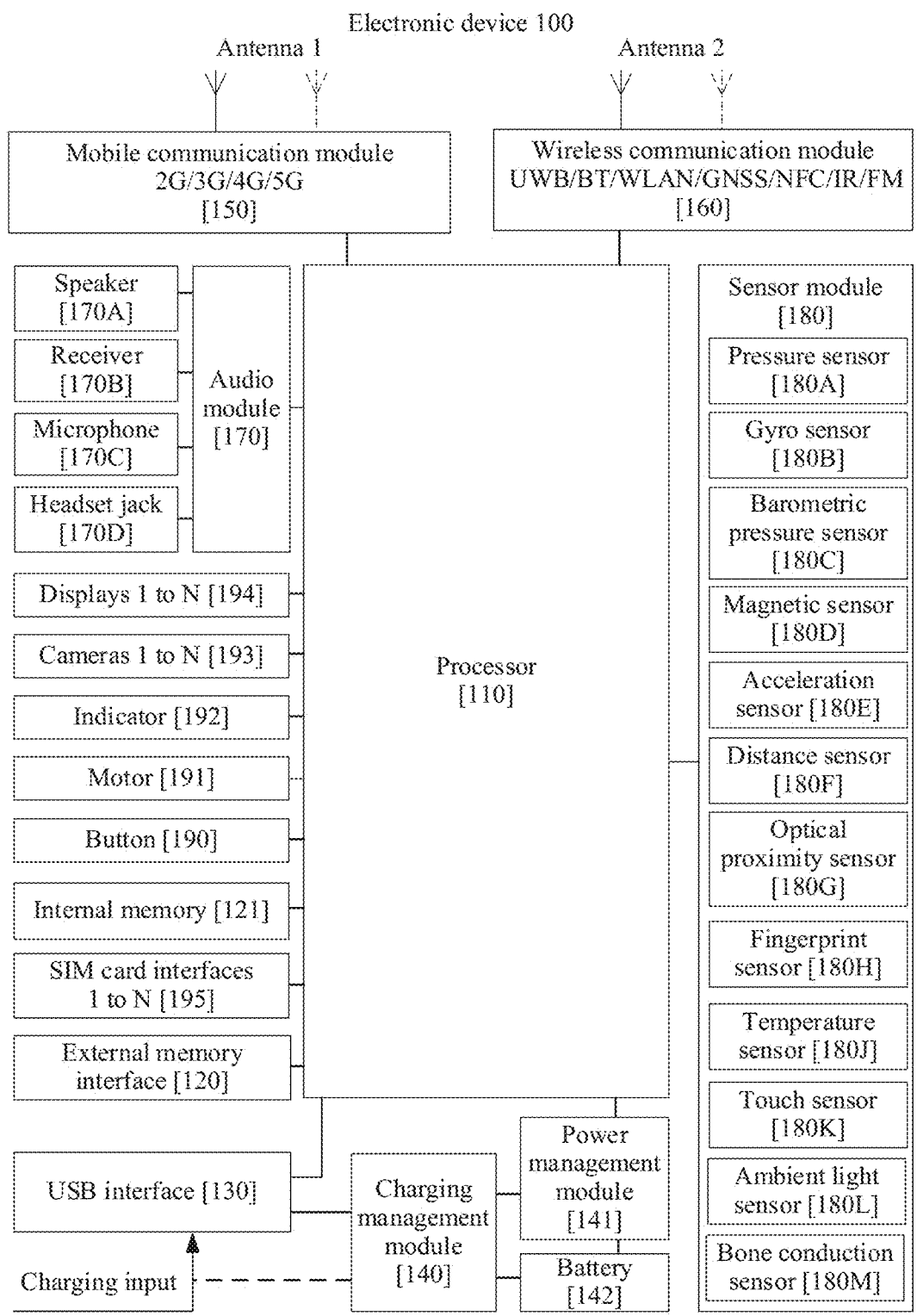
FIG. 1 is a schematic diagram of a structure of an electronic device according to an embodiment of this application.

FIG. 1 is a schematic diagram of a structure of an example of an electronic device 100 according to an embodiment of this application.

The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that, the structure shown in this embodiment of this application constitutes no specific limitation on the electronic device 100. In some other embodiments of this application, the electronic device 100 may include more or fewer components than those shown in the figure, some components may be combined, or some components may be split, or have different component arrangements. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), and/or the like. Different processing units may be independent devices, or may be integrated into one or more processors.

The controller may be a nerve center and a command center of the electronic device 100. The controller may generate an operation control signal based on an instruction operation code and a time sequence signal, to complete control of instruction reading and instruction execution.

A memory may be further disposed in the processor 110, and is configured to store instructions and data. In some embodiments, the memory in the processor 110 is a cache memory. The memory may store instructions or data that just used or cyclically used by the processor 110. If the processor 110 needs to reuse the instructions or the data, the processor may directly invoke the instructions or the data from the memory. This avoids repeated access, reduces waiting time of the processor 110, and improves system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a two-way synchronization serial bus, and includes a serial data line (serial data line, SDA) and a serial clock line (derail clock line, SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device 100.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communication module 160 through the I2S interface, to implement a function of answering a call through a Bluetooth headset.

The PCM interface may also be configured to: perform audio communication, and sample, quantize, and encode an analog signal. In some embodiments, the audio module 170 may be coupled to the wireless communication module 160 through a PCM bus interface. In some embodiments, the audio module 170 may alternatively transmit an audio signal to the wireless communication module 160 through the PCM interface, to implement a function of answering a call through a Bluetooth headset. Both the I2S interface and the PCM interface may be configured to perform audio communication.

The UART interface is a universal serial data bus, and is configured to perform asynchronous communication. The bus may be a two-way communication bus. The bus converts to-be-transmitted data between serial communication and parallel communication. In some embodiments, the UART interface is usually configured to connect the processor 110 to the wireless communication module 160. For example, the processor 110 communicates with a Bluetooth module in the wireless communication module 160 through the UART interface, to implement a Bluetooth function. In some embodiments, the audio module 170 may transmit an audio signal to the wireless communication module 160 through the UART interface, to implement a function of playing music through a Bluetooth headset.

The MIPI interface may be configured to connect the processor 110 to a peripheral device such as the display 194 or the camera 193. The MIPI interface includes a camera serial interface (camera serial interface, CSI), a display serial interface (display serial interface, DSI), and the like. In some embodiments, the processor 110 communicates with the camera 193 through the CSI interface, to implement a photographing function of the electronic device 100. The processor 110 communicates with the display 194 through the DSI interface, to implement a display function of the electronic device 100.

The GPIO interface may be configured by software. The GPIO interface may be configured as a control signal or a data signal. In some embodiments, the GPIO interface may be configured to connect the processor 110 to the camera 193, the display 194, the wireless communication module 160, the audio module 170, the sensor module 180, and the like. The GPIO interface may alternatively be configured as an I2C interface, an I2S interface, a UART interface, an MIPI interface, or the like.

The USB interface 130 is an interface that conforms to a USB standard specification, and may be specifically a mini USB interface, a micro USB interface, a USB type C interface, or the like. The USB interface 130 may be configured to connect to the charger to charge the electronic device 100, or may be configured to transmit data between the electronic device 100 and a peripheral device. The USB interface 130 may alternatively be configured to connect to a headset, to play audio through the headset. The interface may alternatively be configured to connect to another electronic device, for example, an AR device.

It may be understood that an interface connection relationship between the modules illustrated in this embodiment of this application is merely an example for description, and does not constitute a limitation on the structure of the electronic device 100. In some other embodiments of this application, the electronic device 100 may alternatively use an interface connection manner different from an interface connection manner in the foregoing embodiment, or use a combination of a plurality of interface connection manners.

The charging management module 140 is configured to receive a charging input from the charger. The charger may be a wireless charger or a wired charger. In some embodiments of wired charging, the charging management module 140 may receive a charging input from the wired charger through the USB interface 130. In some embodiments of wireless charging, the charging management module 140 may receive a wireless charging input through a wireless charging coil of the electronic device 100. The charging management module 140 may further supply power to an electronic device through the power management module 141 while charging the battery 142.

The power management module 141 is configured to connect to the battery 142, the charging management module 140, and the processor 110. The power management module 141 receives an input of the battery 142 and/or the charging management module 140, to supply power to the processor 110, the internal memory 121, an external memory, the display 194, the camera 193, the wireless communication module 160, and the like. The power management module 141 may be further configured to monitor parameters such as a battery capacity, a battery cycle count, and a battery state of health (electric leakage and impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented through the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the electronic device 100 may be configured to cover one or more communication frequency bands. Different antennas may be further multiplexed, to improve antenna utilization. For example, the antenna 1 may be multiplexed as a diversity antenna in a wireless local area network. In some other embodiments, the antenna may be used in combination with a tuning switch.

The mobile communication module 150 may provide a wireless communication solution that includes 2G, 3G, 4G, 5G, and the like and that is applied to the electronic device 100. The mobile communication module 150 may include at least one filter, a switch, a power amplifier, a low noise amplifier (low noise amplifier, LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules of the mobile communication module 150 may be disposed in the processor 110. In some embodiments, at least some functional modules of the mobile communication module 150 may be disposed in a same device as at least a part of modules of the processor 110.

The modem processor may include a modulator and a demodulator. The modulator is configured to modulate a to-be-sent low-frequency baseband signal into a medium-high frequency signal. The demodulator is configured to demodulate the received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal through an audio device (which is not limited to the speaker 170A, the receiver 170B, or the like), or displays an image or a video through the display 194. In some embodiments, the modem processor may be an independent device. In some other embodiments, the modem processor may be independent of the processor 110, and is disposed in a same device as the mobile communication module 150 or another functional module.

The wireless communication module 160 may provide a solution applied to the electronic device 100, to wireless communication including a UWB, a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), near field communication (near field communication, NFC) technology, an infrared (infrared, IR) technology, and the like. The wireless communication module 160 may be one or more devices integrating at least one communication processing module. The wireless communication module 160 receives the electromagnetic wave through the antenna 2, performs frequency modulation and filtering processing on the electromagnetic wave signal, and sends the processed signal to the processor 110. The wireless communication module 160 may further receive a to-be-sent signal from the processor 110, perform frequency modulation and amplification on the signal, and convert the signal into an electromagnetic wave for radiation through the antenna 2.

In some embodiments, the antenna 1 and the mobile communication module 150 in the electronic device 100 are coupled, and the antenna 2 and the wireless communication module 160 are coupled, so that the electronic device 100 may communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite based augmentation system (satellite based augmentation system, SBAS).

The electronic device 100 implements a display function by using the GPU, the display 194, the application processor, and the like. The GPU is a microprocessor for image processing, and is connected to the display 194 and the application processor. The GPU is configured to: perform mathematical and geometric computation, and render an image. The processor 110 may include one or more GPUs that execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light-emitting diode (active-matrix organic light-emitting diode, AMOLED), a flexible light-emitting diode (flexible light-emitting diode, FLED), a mini-LED, a micro-LED, a micro-OLED, a quantum dot light-emitting diode (quantum dot light-emitting diode, QLED), or the like. In some embodiments, the electronic device 100 may include one or N displays 194. N is a positive integer greater than 1.

In some embodiments of this application, the display 194 displays interface content currently output by a system. For example, the interface content is an interface provided by an instant messaging application.

The electronic device 100 may implement a photographing function by using the ISP, the camera 193, the video codec, the GPU, the display 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise and brightness of the image. The ISP may further optimize parameters such as exposure and color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format such as RGB or YUV. In some embodiments, the electronic device 100 may include one or N cameras 193. N is a positive integer greater than 1.

The digital signal processor is configured to process a digital signal, and may process another digital signal in addition to the digital image signal. For example, when the electronic device 100 selects a frequency, the digital signal processor is configured to perform Fourier transformation and the like on frequency energy.

The video codec is configured to compress or decompress a digital video. The electronic device 100 may support one or more types of video codecs. In this way, the electronic device 100 may play or record videos in a plurality of coding formats, for example, moving picture experts group (moving picture experts group, MPEG)-1, MPEG-2, MPEG-3, and MPEG-4.

The NPU is a neural-network (neural-network, NN) computing processor, quickly processes input information by referring to a structure of a biological neural network, for example, by referring to a mode of transmission between human brain neurons, and may further continuously perform self-learning. Applications such as intelligent cognition of the electronic device 100 may be implemented through the NPU, for example, image recognition, facial recognition, speech recognition, and text understanding.

The external memory interface 120 may be configured to connect to an external memory card, for example, a micro SD card, to extend a storage capability of the electronic device 100. The external memory card communicates with the processor 110 through the external memory interface 120, to implement a data storage function. For example, files such as music and videos are stored in the external storage card.

The internal memory 121 may be configured to store computer-executable program code. The executable program code includes instructions. The processor 110 runs the instructions stored in the internal memory 121, to perform various function applications and data processing of the electronic device 100. The internal memory 121 may include a program storage area and a data storage area. The program storage region may store an operating system, an application required by at least one function (for example, a sound play function and an image play function), and the like. The data storage area may store data (such as audio data and an address book) and the like that are created during use of the electronic device 100. In addition, the internal memory 121 may include a high-speed random access memory, or may include a non-volatile memory, for example, at least one magnetic disk storage device, a flash memory device, or a universal flash storage (universal flash storage, UFS).

The electronic device 100 may implement an audio function such as music playing or recording through the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio input into a digital audio signal. The audio module 170 may be configured to encode and decode an audio signal. In some embodiments, the audio module 170 may be disposed in the processor 110, or some functional modules of the audio module 170 are disposed in the processor 110.

The speaker 170A, also referred to as a "loudspeaker", is configured to convert an audio electrical signal into a sound signal. The electronic device 100 may be used to listen to music or answer a hands-free call through the speaker 170A.

The receiver 170B, also referred to as an "earpiece", is configured to convert an electrical audio signal into a sound signal. When a call is answered or voice information is received through the electronic device 100, the receiver 170B may be put close to a human ear for listening to a voice.

The microphone 170C, also referred to as a "mike" or a "mic", is configured to convert a sound signal into an electrical signal. When making a call or sending a voice message, a user may make a sound near the microphone 170C through the mouth of the user, to input a sound signal to the microphone 170C. The electronic device 100 may be provided with at least one microphone 170C. In some other embodiments, the electronic device 100 may be provided with two microphones 170C, to implement a noise reduction function, in addition to collecting the sound signal. In some other embodiments, the electronic device 100 may alternatively be provided with three, four, or more microphones 170C, to collect a sound signal, reduce noise, identify a sound source, implement a directional recording function, and the like.

The headset jack 170D is configured to connect to a wired headset. The headset jack 170D may be a USB interface 130, or may be a 3.5 mm open mobile terminal platform (open mobile terminal platform, OMTP) standard interface or a cellular telecommunications industry association of the USA (cellular telecommunications industry association of the USA, CTIA) standard interface.

The pressure sensor 180A is configured to sense a pressure signal, and may convert the pressure signal into an electrical signal. In some embodiments, the pressure sensor 180A may be disposed on the display 194. In some optional embodiments of this application, the pressure sensor 180A may be configured to: capture a pressure value generated when a finger part of the user touches the display, and transmit the pressure value to the processor, so that the processor identifies a finger part through which the user enters the user operation.

There is a plurality of types of pressure sensors 180A, for example, a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device 100 determines pressure intensity based on a capacitance change. When a touch operation is performed on the display 194, the electronic device 100 detects intensity of the touch operation through the pressure sensor 180A. The electronic device 100 may further calculate a touch location based on a detection signal of the pressure sensor 180A. In some embodiments, operations performed on different touch locations may correspond to different operation instructions. In some optional embodiments, the pressure sensor 180A may further calculate a quantity of touch points based on a detected signal, and transmit a calculated value to the processor, so that the processor identifies that the user enters a user operation through a single finger or a plurality of fingers.

The gyro sensor 180B may be configured to determine a motion posture of the electronic device 100. In some embodiments, an angular velocity of the electronic device 100 around three axes (namely, axes X, Y, and Z of the electronic device) may be determined through the gyro sensor 180B. The gyro sensor 180B may be configured to implement image stabilization during photographing. For example, when the shutter is pressed, the gyro sensor 180B detects an angle at which the electronic device 100 jitters, obtains, through calculation based on the angle, a distance for which a lens module needs to compensate, and allows the lens to cancel the jitter of the electronic device 100 through reverse motion, to implement image stabilization. The gyro sensor 180B may be further used in a navigation scenario and a motion-sensing game scenario.

The barometric pressure sensor 180C is configured to measure barometric pressure. In some embodiments, the electronic device 100 calculates an altitude based on a value of the barometric pressure measured by the barometric pressure sensor 180C, to assist in positioning and navigation.

The magnetic sensor 180D includes a Hall sensor. The electronic device 100 may detect opening and closing of a flip cover through the magnetic sensor 180D. In some embodiments, when the electronic device 100 is a flip phone, the electronic device 100 may detect opening and closing of a flip through the magnetic sensor 180D. Further, a feature such as automatic unlocking upon opening of the flip is set based on a detected opening or closing state of a smart cover or a detected opening or closing state of the flip.

The acceleration sensor 180E may detect accelerations in various directions (usually on three axes) of the electronic device 100. When the electronic device 100 is still, a magnitude and a direction of gravity may be detected. The acceleration sensor 180E may be further configured to identify a posture of the electronic device, and is used in an application such as switching between a landscape mode and a portrait mode or a pedometer. In some optional embodiments of this application, the acceleration sensor 180E may be configured to capture an acceleration value generated when a finger part of the user touches the display (or a finger of the user taps a rear side bezel of a side bezel of the electronic device 100), and transmit the acceleration value to the processor, so that the processor identifies a finger part through which the user enters a user operation.

The distance sensor 180F is configured to measure a distance. The electronic device 100 may measure a distance in an infrared manner or a laser manner. In some embodiments, the electronic device 100 may measure a distance in a photographing scenario through the distance sensor 180F, to implement quick focusing.

The optical proximity sensor 180G may include, for example, a light-emitting diode (LED) and an optical detector, for example, a photodiode. The light-emitting diode may be an infrared light-emitting diode. The electronic device 100 emits infrared light through the light-emitting diode. The electronic device 100 detects infrared reflected light from a nearby object through the photodiode. When sufficient reflected light is detected, the electronic device 100 may determine that there is an object near the electronic device 100. When insufficient reflected light is detected, the electronic device 100 may determine that there is no object near the electronic device 100. The electronic device 100 may detect, through the optical proximity sensor 180G, that the user holds the electronic device 100 close to an ear for a call, to automatically turn off a display for power saving. The optical proximity sensor 180G may also be used in a smart cover mode or a pocket mode to automatically unlock or lock the screen.

The ambient light sensor 180L is configured to sense ambient light brightness. The electronic device 100 may adaptively adjust brightness of the display 194 based on the sensed ambient light brightness. The ambient light sensor 180L may also be configured to automatically adjust a white balance during photographing. The ambient light sensor 180L may also cooperate with the optical proximity sensor 180G to detect whether the electronic device 100 is in a pocket, to avoid an accidental touch.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device 100 executes a temperature processing policy based on the temperature detected by the temperature sensor 180J. For example, when the temperature reported by the temperature sensor 180J exceeds a threshold, the electronic device 100 lowers performance of a processor near the temperature sensor 180J, to reduce power consumption for thermal protection. In some other embodiments, when the temperature is less than another threshold, the electronic device 100 heats up the battery 142 to avoid abnormal shutdown of the electronic device 100 caused by a low temperature. In some other embodiments, when the temperature is lower than still another threshold, the electronic device 100 boosts an output voltage of the battery 142 to avoid abnormal shutdown caused by a low temperature.

The touch sensor 180K is also referred to as a "touch panel". The touch sensor 180K may be disposed on the display 194, and the touch sensor 180K and the display 194 constitute a touchscreen, which is also referred to as a "touch screen". The touch sensor 180K is configured to detect a touch operation performed on or near the touch sensor 180K. The touch operation is an operation that the user touches the display 194 by using a hand, an elbow, a stylus, or the like. The touch sensor may transfer the detected touch operation to the application processor to determine a type of the touch event. The display 194 may provide a visual output related to the touch operation. In some other embodiments, the touch sensor 180K may alternatively be disposed on a surface of the electronic device 100 at a location different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a human pulse, to receive a blood pressure beating signal. In some embodiments, the bone conduction sensor 180M may alternatively be disposed in the headset, to obtain a bone conduction headset. The audio module 170 may obtain a voice signal through parsing based on the vibration signal that is of the vibration bone of the vocal-cord part and that is obtained by the bone conduction sensor 180M, to implement a voice function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The electronic device 100 may receive a key input, and generate a key signal input related to a user setting and function control of the electronic device 100.

The motor 191 may generate a vibration prompt. The motor 191 may be configured to provide an incoming call vibration prompt or a touch vibration feedback. For example, touch operations performed on different applications (for example, photographing and audio playback) may correspond to different vibration feedback effects. For touch operations performed on different areas of the display 194, the motor 191 may also correspond to different vibration feedback effects. Different application scenarios (for example, a time reminder, information receiving, an alarm clock, and a game) may also correspond to different vibration feedback effects. A touch vibration feedback effect may be further customized.

The indicator 192 may be an indicator light, and may indicate a charging status and a power change, or may indicate a message, a missed call, a notification, and the like.

The SIM card interface 195 is configured to connect to a SIM card. The SIM card may be inserted into the SIM card interface 195 or withdrawn from the SIM card interface 195, to implement contact with or separation from the electronic device 100.

Image search is a very common function on an electronic device 100. The electronic device 100 may provide a user with related image materials on an internet or a database. Images on web pages and images stored on the database of the electronic device 100 are images that can be found. In some application scenarios, the user may enter a keyword in an image search engine carried on the electronic device 100. The image search engine may extract a related image from the web pages or the database, and the electronic device 100 outputs a result page including an image collection related to the keyword.

Figure 2A:
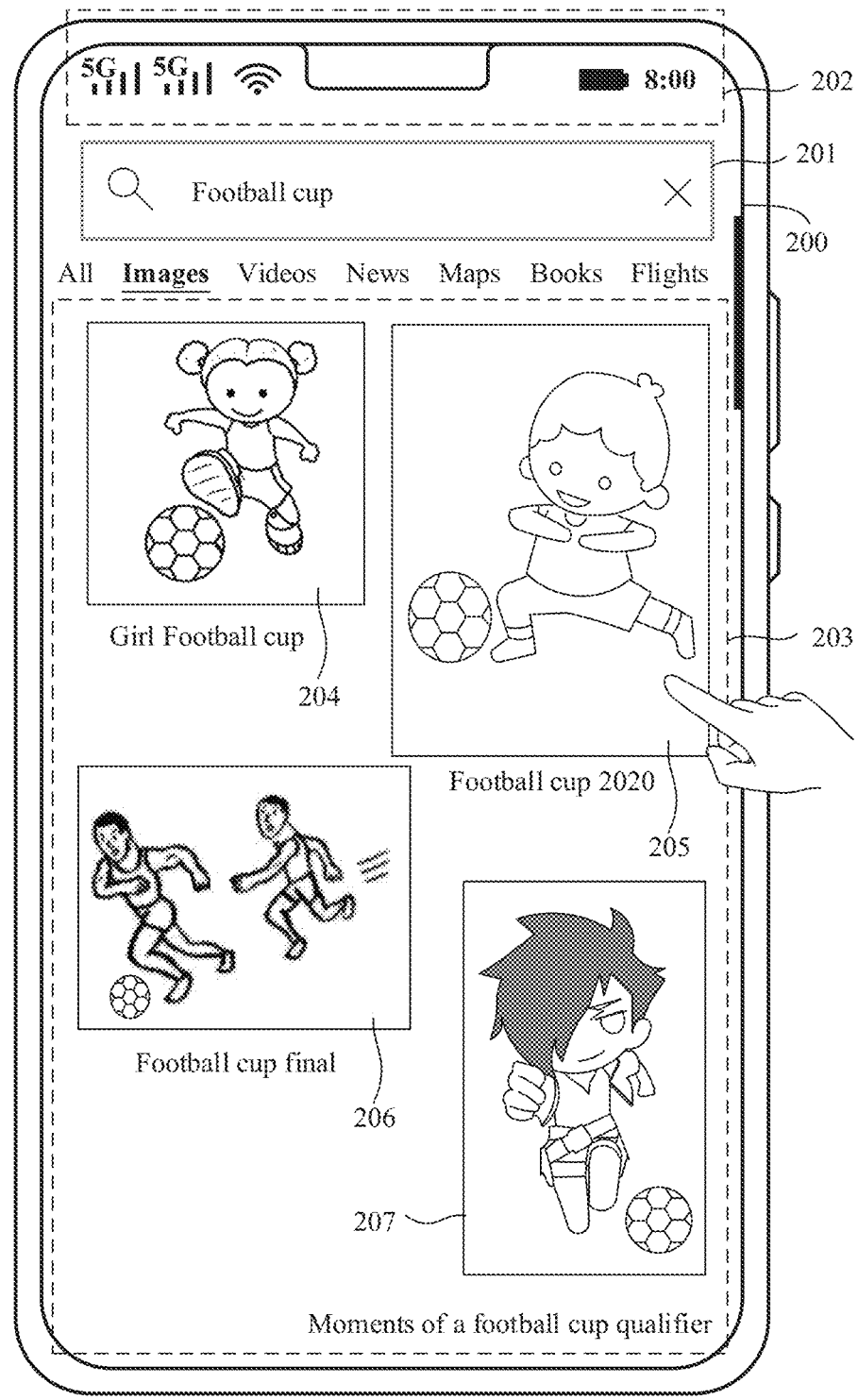
FIG. 2*a* and FIG. 2*b* are schematic diagrams of application interfaces of an image search method according to an embodiment of this application.

Currently, an image search result page usually displays images on a web page in a tiled manner. FIG. 2a shows an image search page 200. The image search page 200 includes a status bar 201, a search box 202, and a search result area 203.

The status bar 201 may include one or more signal strength indicators of a mobile communication signal (which may also be referred to as a cellular signal), one or more signal strength indicators of a wireless fidelity (wireless fidelity, Wi-Fi) signal, a battery status indicator, and a time indicator.

Figure 2B:
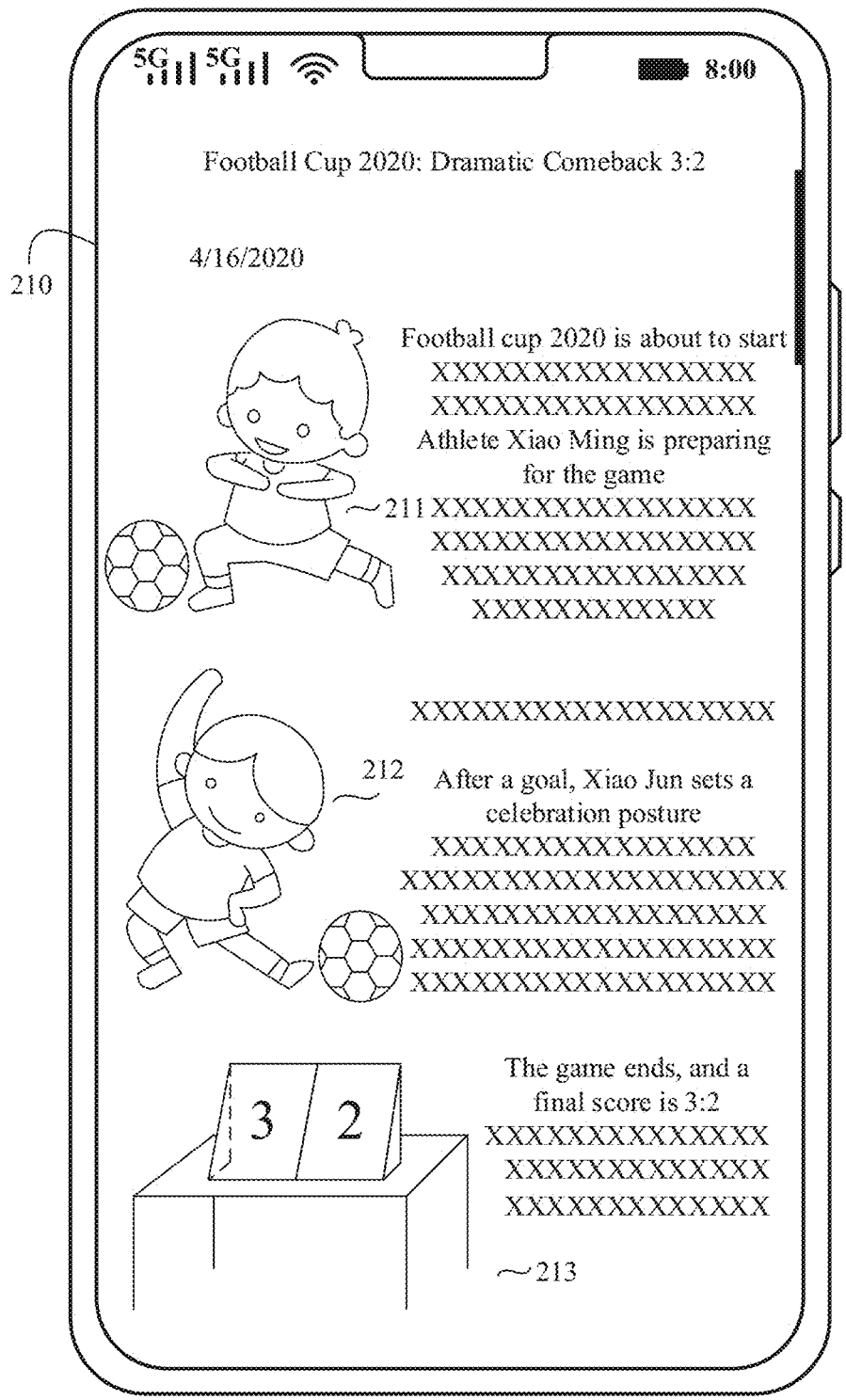

The user enters a keyword "football cup" in the search box 202, and the electronic device 100 outputs a result page in the search result area 203. The result page includes a plurality of images related to the football cup, for example, an image 204, an image 205, an image 206, and an image 207. The user may slide down to view more images. Further, the user may view a source path of each image, and enter a details page of each image. For example, as shown in FIG. 2b, when receiving a user operation for the image 205, the electronic device 100 displays a page 210 of a source web page corresponding to the image 205. A theme of the page 210 is "Football Cup 2020: Dramatic Comeback 3:2", and a release date is Apr. 16, 2020. Images shown on the page 210 include an image 211 (namely, the image 205 in FIG. 2a), an image 212, and an image 213. That is, when receiving the keyword "football cup" that needs to be searched for, the electronic device 100 finds that the image 211 on the page 210 is related to the "football cup", and the electronic device 100 displays the image 211 in the search result area 203 shown in FIG. 2a. The image 205 is the image 211. It may be learned that, source paths of the images 205 to 207 shown in FIG. 2a are different. The images are related to the keyword but lack association with each other.

Figure 3:
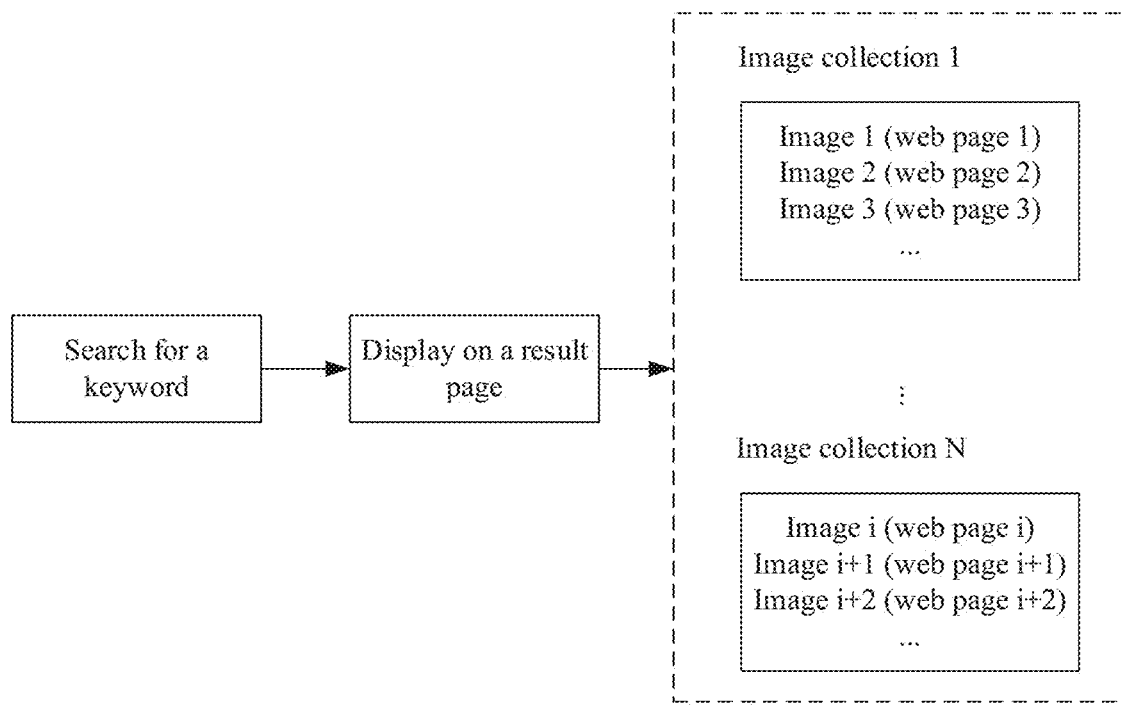
FIG. 3 is a schematic diagram of a principle of an image search method according to an embodiment of this application.

In an implementation, the electronic device 100 searches an entire network for images related to the keyword, classifies the images into image collections of different themes, and displays the image collections on an image search result page, so that the user may view the image collections of different themes. A theme classification manner may be time-based classification, location-based classification, scenario type classification based on image recognition, or the like. As shown in FIG. 3, the electronic device 100 retrieves a plurality of images related to a search term based on the received keyword. The electronic device 100 classifies the plurality of images into image collections of different themes, and displays the image collections on the image search result page. Images in each image collection are images of a same theme, and source paths of the images in each image collection may be different. For example, an image 1 is from a web page 1, an image 2 is from a web page 2, and the like. In this way, the user may view all images of a same theme, so that the user can find a plurality of desired images. In this manner, images in each themed image collection are from a plurality of different web pages.

Figure 4:
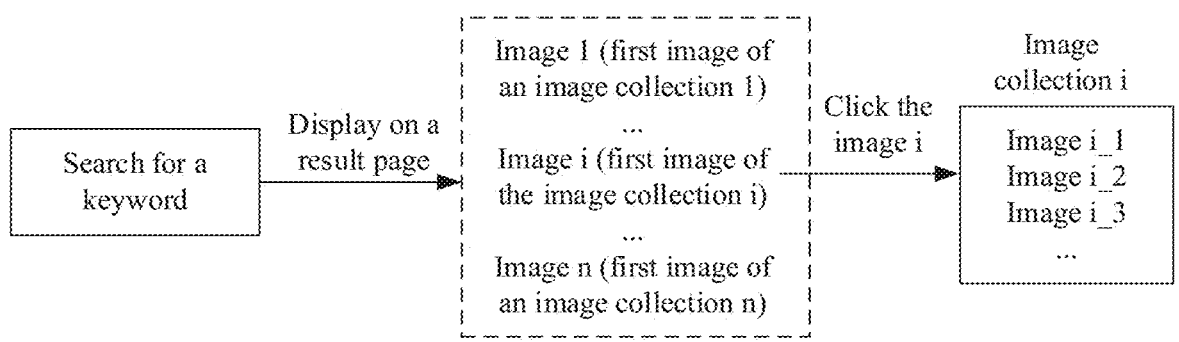
FIG. 4 is a schematic diagram of a principle of another image search method according to an embodiment of this application.

In an implementation, the electronic device 100 searches the entire network for images related to the keyword, and then displays, in a form of an image collection, images of a same site (namely, a website, where one site may include a plurality of web pages). As shown in FIG. 4, the electronic device 100 retrieves a plurality of images related to the search term based on the received keyword. The electronic device 100 outputs a result page, and displays, on the result page, a plurality of images from different sites, for example, an image 1, an image i, and an image n. Each image is a first image in an image collection. After clicking an image on the result page, the user may enter a details page corresponding to the image to browse these image collections. In this way, the user may view all images of the same site. This improves association between the images. In this manner, a home page of the image collection is displayed on the search result page. Other images in the image collection can be viewed only after clicking the first image in the image collection to enter the details page.

An embodiment of this application provides an image search method. An electronic device 100 can display, on a search result page in a form of an image collection, a plurality of images that are of a same theme and that are displayed on a same web page. Because the images on the same web page have stronger coherence and storytelling, for example, as shown in FIG. 2b, a theme of the web page shown in FIG. 2b is "Football Cup 2020", and all three images on the web page are related images of the game. In this case, the electronic device 100 may display the images on an image search result page in the form of the image collection, to provide a user with more coherent and smoother browsing experience.

The following describes a display form of the image search method in this embodiment of this application on an application interface.

Figure 5A:
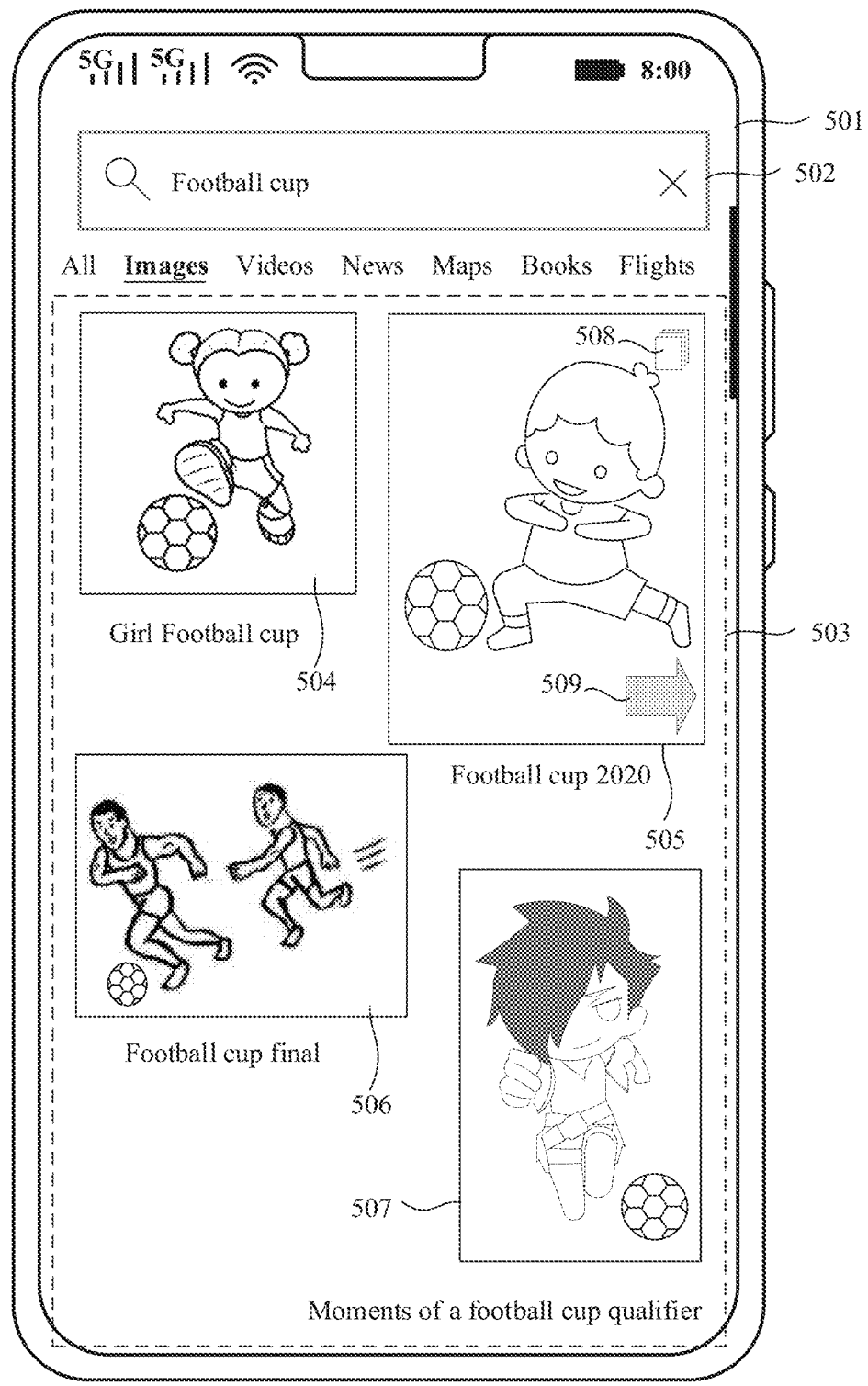
FIG. 5*a* to FIG. 5*c* are schematic diagrams of application interfaces of an image search method according to an embodiment of this application.

For example, the electronic device 100 searches for a keyword "football cup". The electronic device 100 can display, on the search result page in the form of the image collection, the plurality of images that are of the same theme and that are displayed on the same web page. FIG. 5a shows an image search page 501. The image search page 501 includes a search box 502 and a search result area 503. The user enters the keyword "football cup" in the search box 502. The electronic device 100 outputs a result page in the search result area 503. The result page includes a plurality of image display areas (which may also be referred to as view components), and each image display area displays images related to the keyword. For example, FIG. 5a shows four image display areas, the image display areas respectively display an image 504, an image 505, an image 506, and an image 507. The image 505 includes an image collection identifier 508 and a control 509. The image collection identifier 508 indicates that an image display area in which the image 505 is located includes more than one image, namely, one image collection. The image 505 is a first image of the image collection, and the user may view another image in the image collection. The control 509 is used to view a next image in the image collection.

A page of a source web page of the image 505 is shown in FIG. 2b. FIG. 2b includes three images. Because the three images are all related images of the football cup and are from a same web page, the images have association and storytelling. Therefore, the electronic device 100 displays the three images on the same web page on the search result page in the form of the image collection, that is, the image collection corresponding to the image 505 includes the three images shown in FIG. 2b.

When displaying the page 501, the electronic device 100 receives a user operation for the control 509, and displays a next image of the image 505 in the image collection. Optionally, the electronic device 100 switches the image 505 to the next image in the image collection.

Figure 5B:
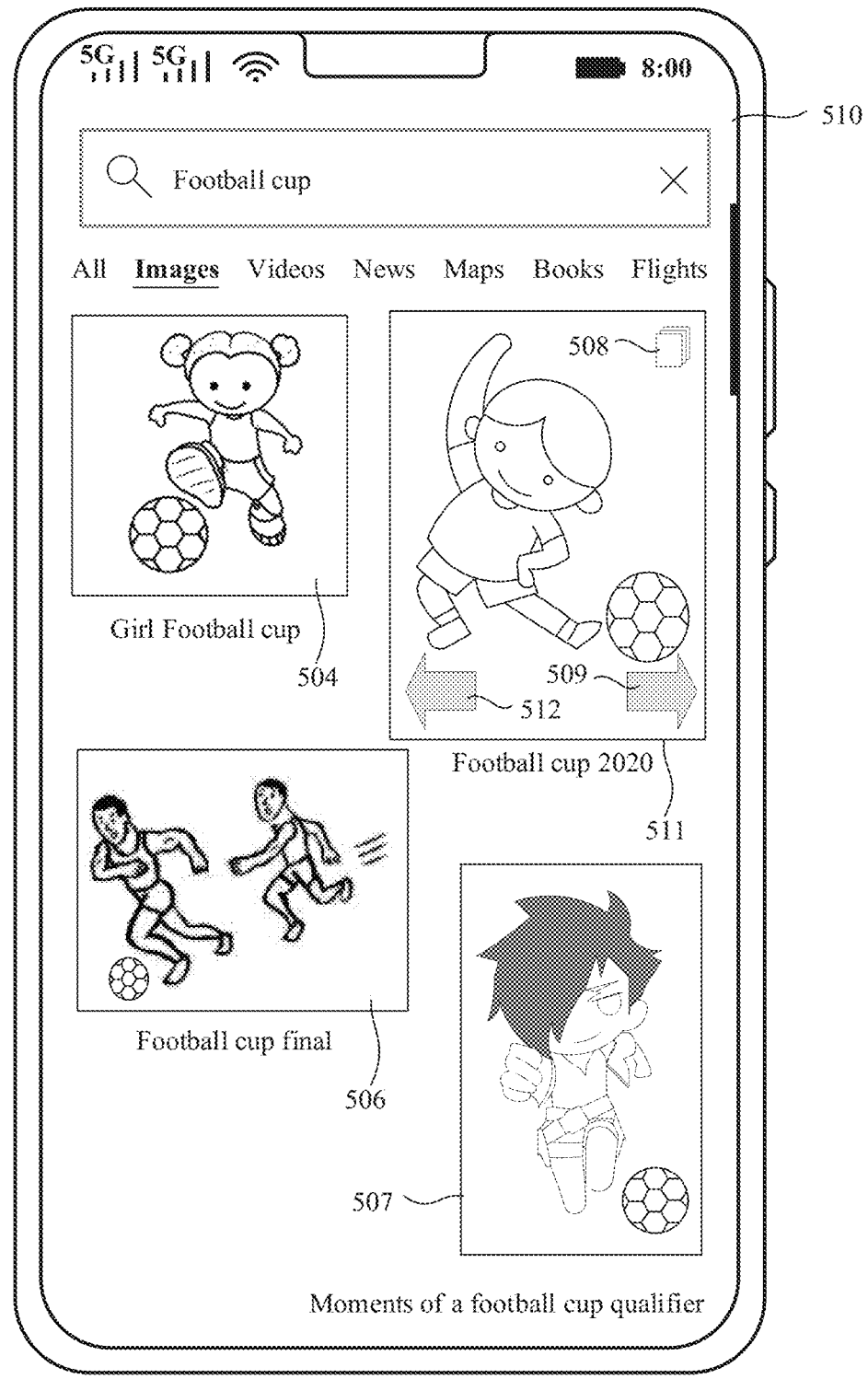

As shown in FIG. 5b, when displaying the page 501, the electronic device 100 receives the user operation for the control 509, and displays a page 510. Compared with the page 501, on the page 510, the image 505 is replaced with an image 511, and the image 511 is the next image of the image 505 in the image collection. The image 511 includes the image collection identifier 508 and the control 509, and further includes a control 512. The control 512 is configured to view a previous image in the image collection. When displaying the page 510, the electronic device 100 receives a user operation for the control 512, and switches the image 511 to the image 505, that is, displays the page 501.

When displaying the page 510, the electronic device 100 receives a user operation for the control 509, and displays a next image of the image 511 in the image collection. Optionally, the electronic device 100 switches the image 511 to a next image in the image collection.

Figure 5C:
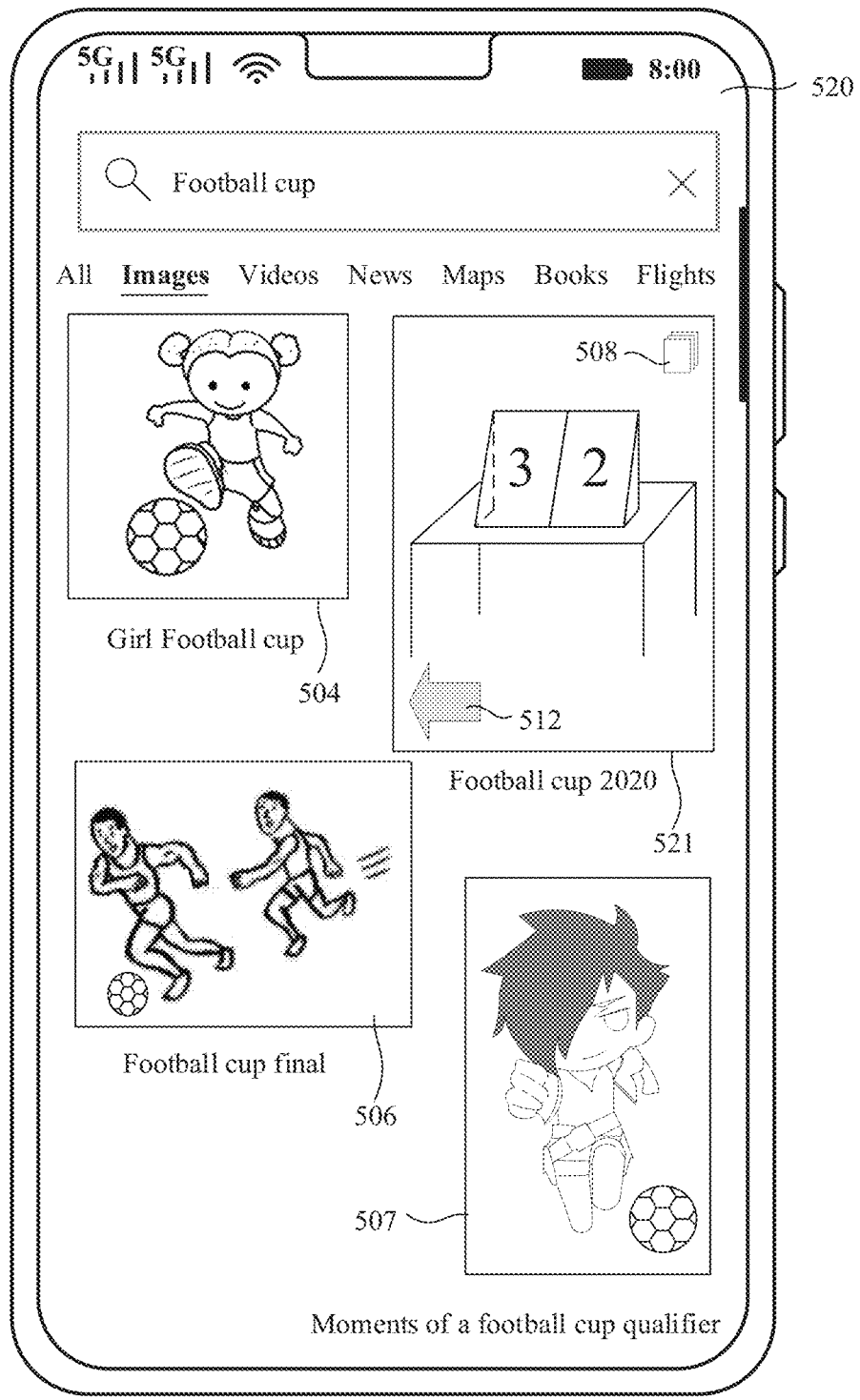

As shown in FIG. 5c, when displaying the page 510, the electronic device 100 receives the user operation for the control 509, and displays a page 520. Compared with the page 510, on the page 510, the image 511 is switched to an image 521, and the image 521 is a next image of the image 511 in the image collection. The image 521 includes the image collection identifier 508 and the control 512. The control 512 is configured to view a previous image in the image collection. Because the image 521 in the image collection is a last image, and a next image cannot be viewed, the image 521 does not include the control 509. When displaying the page 520, the electronic device 100 receives a user operation for the control 512, and switches the image 521 to the image 511, that is, displays the page 510.

In some embodiments, a control (the control 509 or the control 512) for viewing a next image or a previous image on a search result page (for example, the page 501, the page 510, or the page 520) is optional. A manner of clicking a control is not limited. The user may also switch to a next image or a previous image by using a sliding operation. When receiving a leftward sliding operation for the image 505, the electronic device 100 switches the image 505 to a next image in the image collection, that is, displays the page 510. When receiving a rightward sliding operation for the image 511, the electronic device 100 switches the image 511 to a previous image in the image collection, that is, displays the page 501.

In some embodiments, if an image display area on the search result page includes an image collection, the image display area may automatically switch an image in the image collection, for example, switch to a next image at an interval of one second. Optionally, when detecting that dwell time of the search result page exceeds a threshold, the electronic device 100 automatically switches the image in the image collection at an interval.

In some embodiments, source paths of the images in the image collection may be a same web page, or may be a plurality of web pages.

In some embodiments, the user may view enlarged images of the images to obtain more detailed information. For example, the electronic device 100 receives a user operation for the image 505, and enters a details page for the image 505. The user operation may be clicking an image display area corresponding to the image 505 in FIG. 5a, or may be clicking an image display area corresponding to the image 511 in FIG. 5b, or may be clicking an image display area corresponding to the image 521 in FIG. 5c.

Figure 6A:
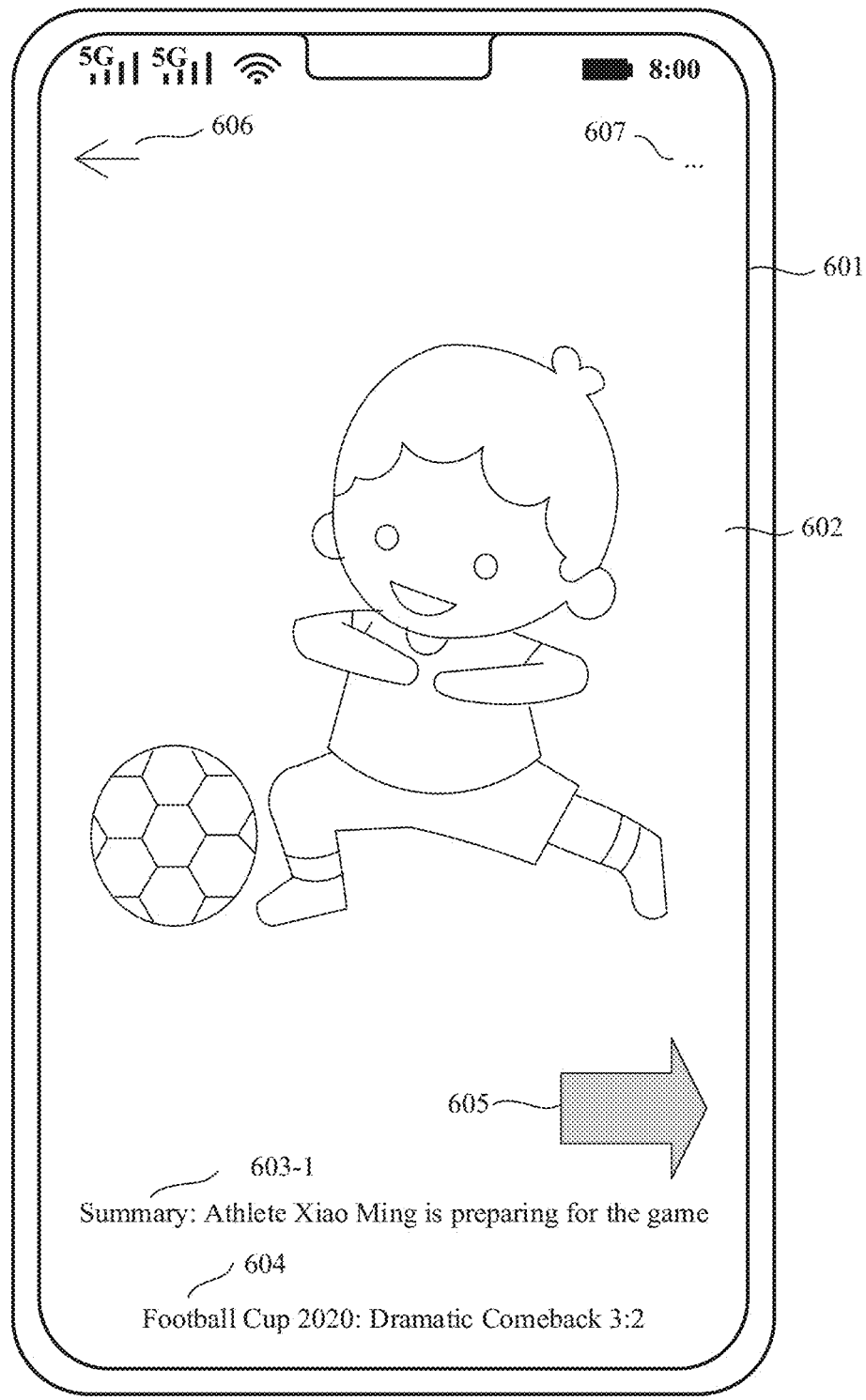
FIG. 6*a* to FIG. 6*c* are schematic diagrams of application interfaces of an image search method according to an embodiment of this application.

FIG. 6a shows an example of an image details page 601 corresponding to the image 505. The image details page 601 includes an image display area 602, a summary 603-1, a title 604, a next control 605, a return control 606, and a more control 607.

An image displayed in the image display area 602 is an enlarged image corresponding to the image 505.

The summary 603-1 is a related description corresponding to the image 505 currently displayed in the image display area 602. The related description corresponding to the image 505 may be a feature description obtained by the electronic device 100 through image recognition on the image 505, or may be a text description that is related to the image 505 and that is determined by the electronic device 100 from text descriptions included in the source web page of the image 505, for example, a summary of the image 505 shown in FIG. 6a is "Athlete Xiao Ming is preparing for the game", or may be a text description that is related to the image 505 and that is determined by the electronic device 100 with reference to an image feature of the image 505 and a text on the source web page.

The title 604 is a web page title of the source web page of the image 505.

The return control 606 is configured to return to a previous-level page. Optionally, the previous-level page may be the search result page 501 shown in FIG. 5a.

The more control 607 is configured to provide more functions, for example, copying an image, saving an image, and editing an image.

The next control 605 is configured to view the next image of the image 505 currently displayed in the image display area 602. The page of the source web page of the image 505 is shown in FIG. 2b. FIG. 2b includes the three images. Because the three images are all related images of the football cup and are from the same web page, the images have association and storytelling. Therefore, the electronic device 100 displays, on the search result page in the form of the image collection, the three images on the same web page. The image 505 is the first image in the image collection. When receiving a user operation for the control 605, the electronic device 100 displays the next image of the image 505 in the image display area 602.

Figure 6B:
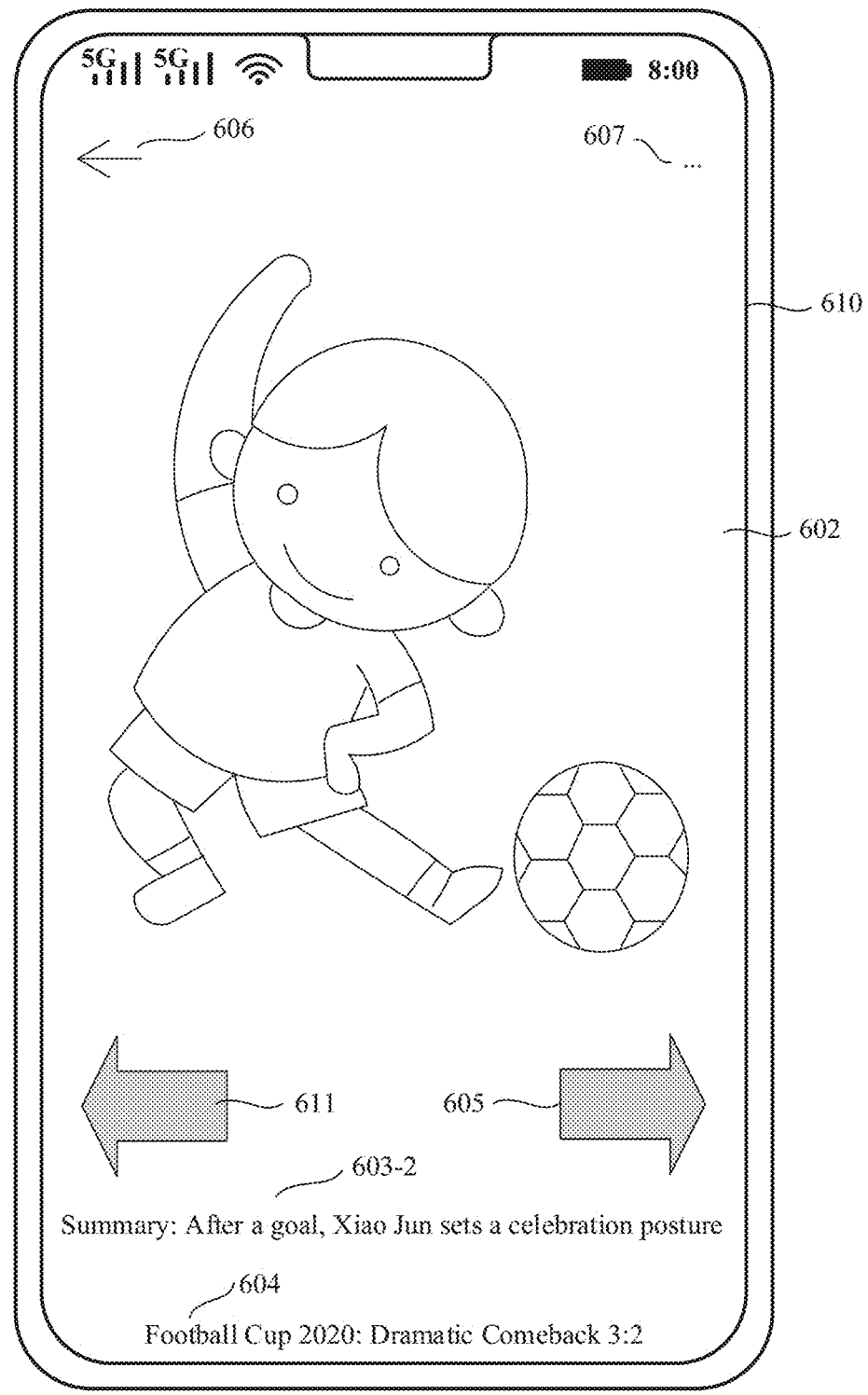

As shown in FIG. 6b, when displaying the image details page 601, the electronic device 100 receives the user operation for the control 605, and displays an image details page 610 corresponding to the image 511. Optionally, when receiving a user operation for the image 511, the electronic device 100 enters the image details page 610 for the image 511. The user operation may be clicking the image display area corresponding to the image 505 in FIG. 5a, or may be clicking the image display area corresponding to the image 511 in FIG. 5b, or may be clicking the image display area corresponding to the image 521 in FIG. 5c.

An image details page 601 includes an image display area 602, a summary 603-2, a title 604, a next control 605, a return control 606, a more control 607, and a previous control 611.

An image displayed in the image display area 602 is an enlarged image corresponding to the image 511.

The summary 603-2 is a related description corresponding to the image 511 currently displayed in the image display area 602. The related description corresponding to the image 511 may be a feature description obtained by the electronic device 100 through image recognition on the image 511, or may be a text description that is related to the image 511 and that is determined by the electronic device 100 from text descriptions included in a source web page of the image 511, for example, a summary of the image 511 shown in FIG. 6b is "After a goal, Xiao Jun sets a celebration posture", or may be a text description that is related to the image 511 and that is determined by the electronic device 100 with reference to an image feature of the image 511 and a text on the source web page.

The title 604 is a web page title of the source web page of the image 511.

The previous control 611 is configured to view a previous image of the image 511 currently displayed in the image display area 602. When receiving a user operation for the control 611, the electronic device 100 displays, in the image display area 602, a previous image of the image 511 in the image collection, namely, the image 505. That is, the electronic device 100 displays the image details page 601 shown in FIG. 6a.

The return control 606 is configured to return to a previous-level page. Optionally, the previous-level page may be the search result page 501 shown in FIG. 5a. Optionally, the previous-level page may be the search result page 510 shown in FIG. 5b.

The more control 607 is configured to provide more functions, for example, copying an image, saving an image, and editing an image.

The next control 605 is configured to view a next image of the image 511 currently displayed in the image display area 602. When receiving the user operation for the control 605, the electronic device 100 displays the next image of the image 511 in the image display area 602.

Figure 6C:
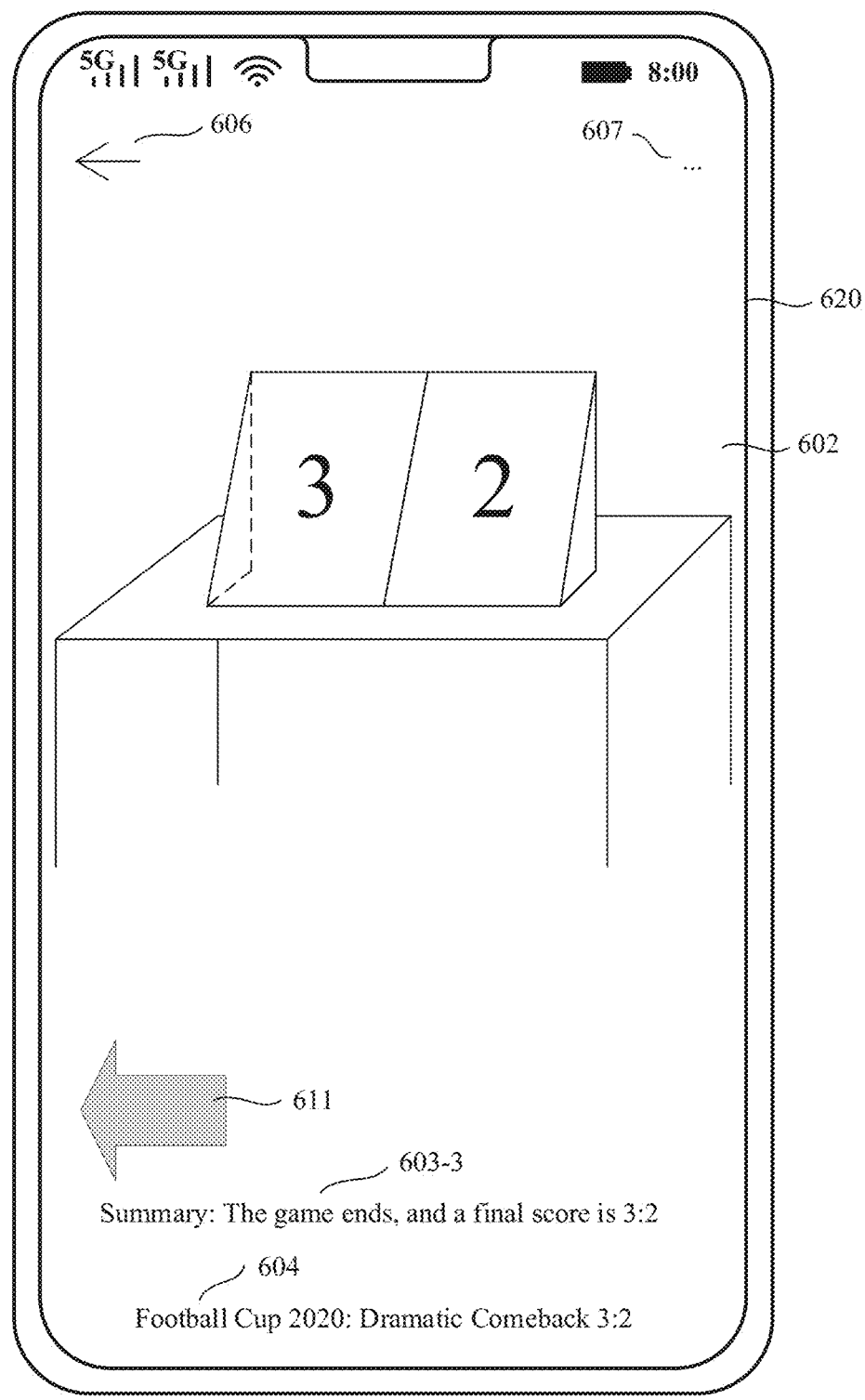

As shown in FIG. 6c, when displaying the image details page 610, the electronic device 100 receives the user operation for the control 605, and displays an image details page 620 corresponding to the image 521. Optionally, when receiving a user operation for the image 521, the electronic device 100 enters the image details page 620 for the image 521. The user operation may be clicking the image display area corresponding to the image 505 in FIG. 5a, or may be clicking the image display area corresponding to the image 511 in FIG. 5b, or may be clicking the image display area corresponding to the image 521 in FIG. 5c.

The image details page 620 includes the image display area 602, a summary 603-3, the title 604, the previous control 611, the return control 606, and the more control 607.

The image displayed in the image display area 602 is an enlarged image corresponding to the image 521.

The summary 603-3 is a related description corresponding to the image 521 currently displayed in the image display area 602. For example, a summary of the image 521 shown in FIG. 6c is "The game ends, and the final score is 3:2".

The title 604 is a web page title of a source web page of the image 521.

The previous control 611 is configured to view a previous image of the image 521 currently displayed in the image display area 602. When receiving a user operation for the control 611, the electronic device 100 displays, in the image display area 602, a previous image of the image 521 in the image collection, namely, the image 511. That is, the electronic device 100 displays the image details page 610 shown in FIG. 6b.

The return control 606 is configured to return to a previous-level page. Optionally, the previous-level page may be the search result page 501 shown in FIG. 5a. Optionally, the previous-level page may be the search result page 510 shown in FIG. 5b. Optionally, the previous-level page may be the search result page 520 shown in FIG. 5c.

The more control 607 is configured to provide more functions, for example, copying an image, saving an image, and editing an image.

It may be understood that the display interfaces shown above are all examples, and a form, a location, a size, and the like of the display area, the display content, and the display control do not constitute a limitation on embodiments of this application.

The foregoing uses an example in which the electronic device 100 searches for and displays an image, and is not limited to the image. The image collection displayed by the electronic device 100 on the search result page may also include a video.

Based on the foregoing hardware structure of the electronic device 100 and the display interfaces of the image search method, the following describes a method principle of the image search method in embodiments of this application.

In this embodiment of this application, an electronic device 100 analyzes a web page. Based on correlation between an image and a text included in the web page, image quality, an image aesthetic feature, and the like, the electronic device 100 extracts some or all images on the web page as an image collection of the web page, and determines a text summary of each image in the image collection. The text summary may be determined based on an image feature and/or a text on the web page. When receiving an index term entered by a user, and retrieving that the index term is related to the web page, the electronic device 100 displays, on a search result page, an image collection corresponding to the web page, that is, the user may view all images related to the index term on the web page. In this way, in a manner in which the electronic device 100 displays images on a single web page in a form of an image collection on the search result page, association and storytelling between images on a source web page of the image collection are maintained, and search experience of the user is improved.

In some embodiments, the electronic device 100 may extract some or all videos on the web page, and add the videos to the image collection of the web page based on correlation between a video and a text included in the web page, video quality, a video aesthetic feature, and the like. That is, the image collection corresponding to the web page may include an image and/or a video.

First, technical terms in this embodiment of this application are described.

URL: Uniform resource locator, Uniform Resource Locator. A URL is an identification method used to describe addresses of a web page and another resource on an Internet. A URL address is also referred to as a web page address. It is a standard resource address (Address) on the internet.

OBS bucket: An object storage service (Object Storage Service, OBS) is a stable, secure, efficient, and easy-to-use cloud storage service. With a standard Restful API interface, the object storage service may store any quantity and form of unstructured data. A bucket (Bucket) is a container for storing objects in the OBS. Object storage provides a flat storage manner based on the bucket and an object. All objects in a bucket are at a same logical layer, eliminating a multi-layer tree directory structure in a file system. Each bucket has attributes such as a storage class, an access permission, and a region to which the bucket belongs. The user may create buckets with different storage classes and access permissions in different regions, and configure more advanced attributes to meet storage requirements in different scenarios. In this embodiment of this application, an image thumbnail, image index data, and the like may be stored by using the OBS bucket.

Image aesthetic scoring: scores an image based on an aesthetic scoring algorithm. For an image aesthetic scoring algorithm, some quantized image aesthetic rules may be used, for example, distribution of important features in a composition of a photographed image. These aesthetic scoring rules may come from experience summarization. Common aesthetic scoring rules include, for example, a trichotomy, a principal diagonal principle, a visual balance, and determining a proportion of a photographed subject in a composition. There may be different image aesthetic rules based on different requirements. An aesthetic score Ei may be calculated according to each rule. A final aesthetic score of an image may be an aesthetic score calculated according to any rule, or may be a weighted average of aesthetic scores calculated according to a plurality of rules, that is, E=ΣwiEi. wi represents a weight. Specifically, an aesthetic score under each rule may be represented as Ei=g(Si, Fi). Si describes a size and a location of the photographed subject, Fi describes distribution of main features in a composition of the image, and g is a custom function (for example, a Gaussian function).

Video aesthetic scoring: Similar to the image aesthetic scoring, an image frame is extracted from a video, and a video aesthetic score may be a weighted average of aesthetic scores of a plurality of image frames in the video.

Image quality scoring: analyze and study an image feature and score an image based on some image quality evaluation indicators and methods to evaluate image quality (for example, an image distortion degree).

Figure 7:
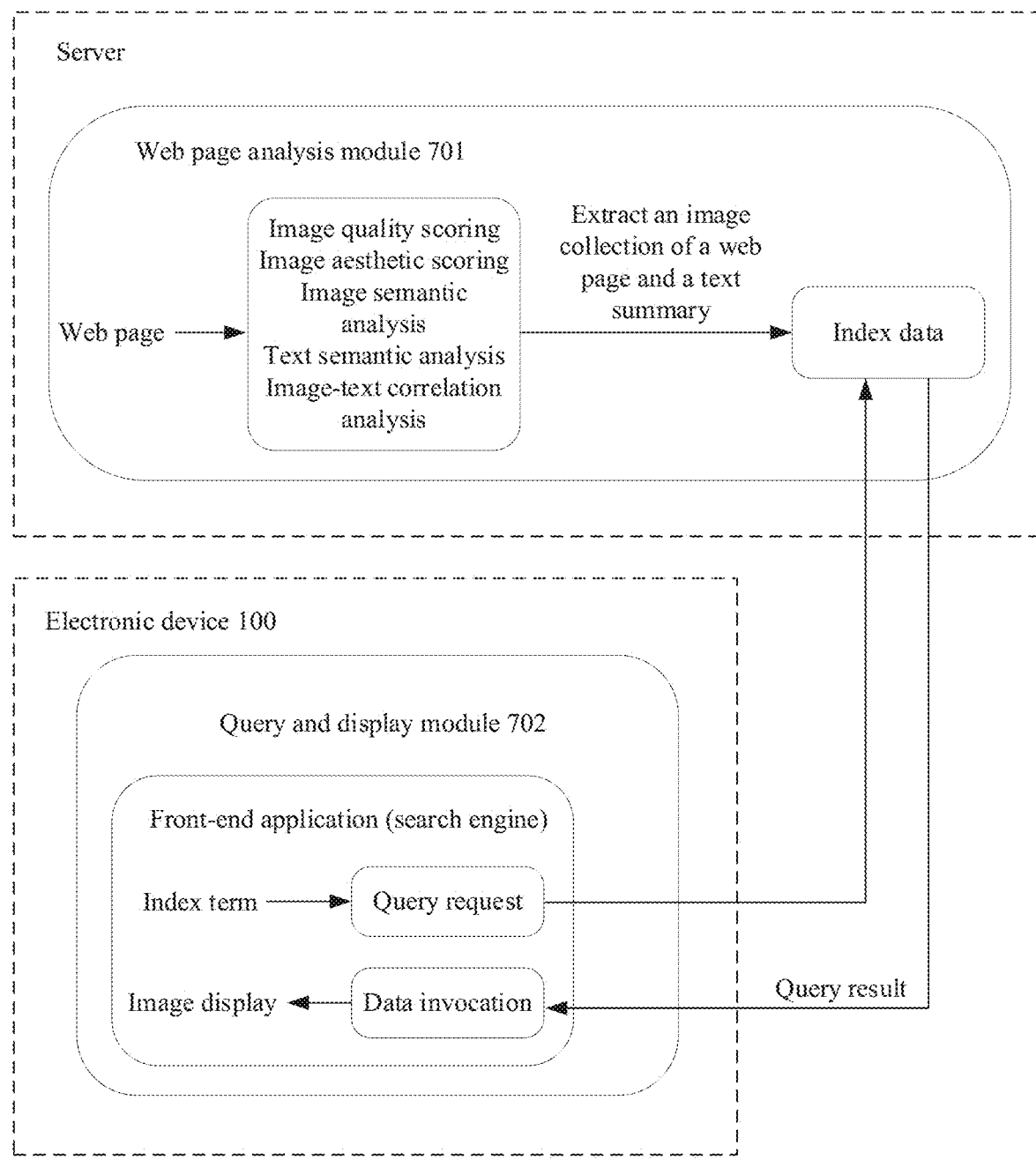
FIG. 7 is a diagram of a technical architecture of an image search method according to an embodiment of this application.

The following describes a technical architecture of an image search method according to an embodiment of this application. FIG. 7 is an example of a diagram of a software architecture of an image search method.

As shown in FIG. 7, a server includes a web page analysis module 701. An electronic device 100 includes a query and display module 702. The server analyzes an image and a text on a web page based on the web page analysis module 701, and establishes index data. The electronic device 100 searches for an index term in the index data based on the query and display module 702, obtains a matched image, and displays the matched image on a front end in a specific form.

The web page analysis module 701 is configured to analyze the image and the text on the web page, extract images that meet a preset condition as an image collection of the web page, determine text summaries related to the images, and then store extracted and determined information into the index data. A piece of index data includes web page information of a web page, main image information, and information about other images in the extracted images. The information includes but is not limited to a web page address, a web page title, an identity of each of the extracted images on the web page, an original image URL, an OBS bucket image URL, text summaries related to the images, and the like. The electronic device 100 may find the piece of index data based on any piece of data in the index data, and obtain data content of the piece of index data. The original image URL may be used to query an address of the image on a source web page. The OBS bucket image URL is an address of the image in an image host (namely, an OBS bucket). Optionally, one or more pieces of index data may be determined for a web page.

An analysis algorithm for the web page includes but is not limited to an algorithm such as image quality scoring, image aesthetic scoring, image semantic analysis, text semantic analysis, image-text correlation analysis, and the like.

The web page analysis module 701 determines, on a web page based on the image quality scoring algorithm and the image aesthetic scoring algorithm, the images that meet the preset condition. The preset condition includes, for example, that an image quality score of an image is greater than a second threshold and/or an image aesthetic score of the image is greater than a third threshold. Then, a plurality of images that are strongly correlated (correlation is greater than a fourth threshold) with the web page title are extracted from the determined images based on the image-text correlation analysis, and the plurality of images are the image collection of the web page. In addition, the web page analysis module 701 extracts, based on the image-text correlation analysis, a related text of each image in the image collection on the web page as a text summary corresponding to each image.

Figure 8:
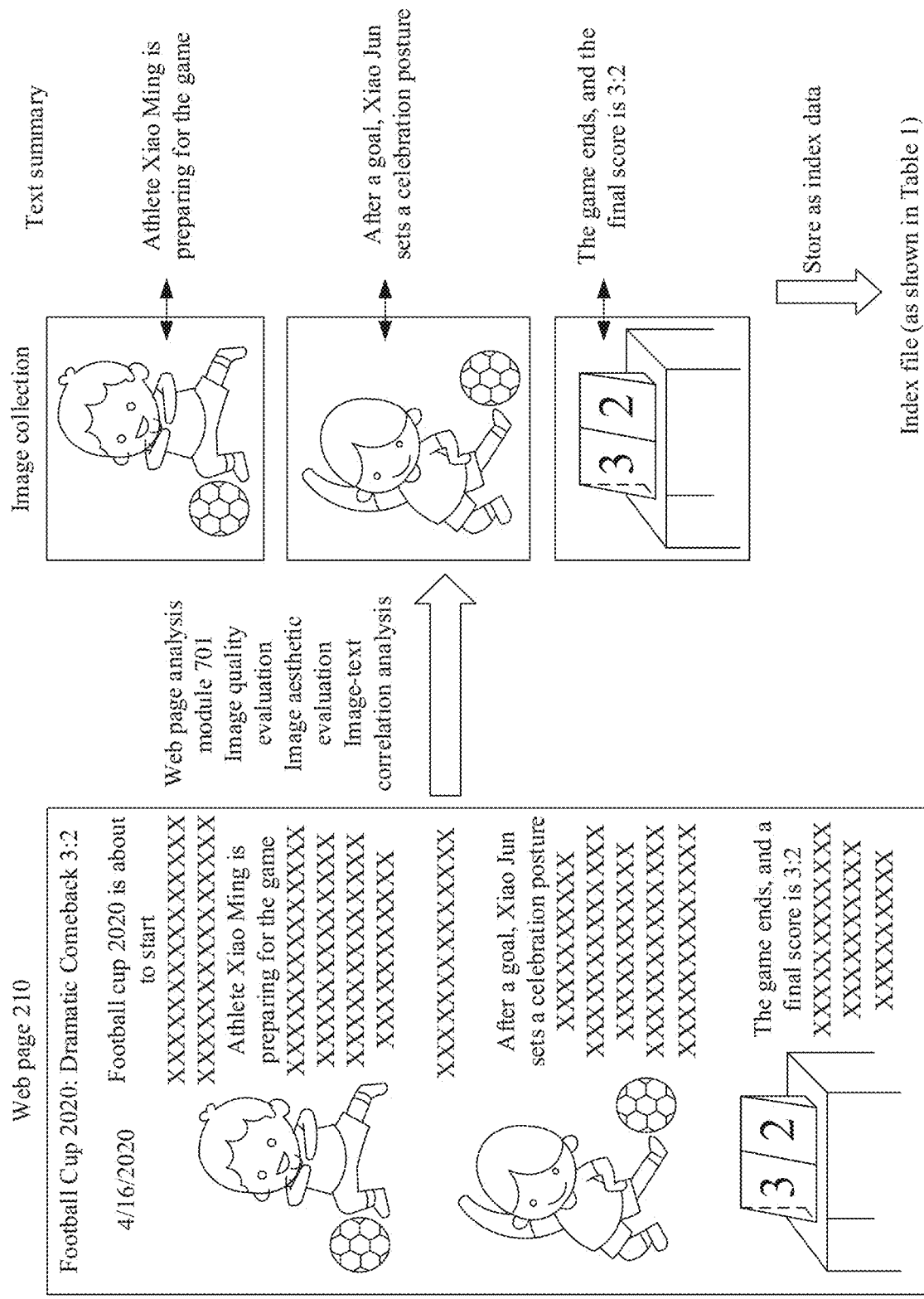
FIG. 8 is a schematic diagram of a principle of an image search method according to an embodiment of this application.

A web page shown in FIG. 2*b* is used as an example. A web page title is "Football cup 2020: Dramatic comeback 3:2". It may be learned that a web page 210 shown in FIG. 2*b* includes three images: an image 211, an image 212, and an image 213. As shown in FIG. 8, the web page analysis module 701 extracts, from the page 210 based on an image quality evaluation algorithm and the image aesthetic scoring algorithm, images that meet the preset condition. In addition, it is determined through the image-text correlation analysis that correlation between the three images and the web page title is strong. Therefore, the web page analysis module 701 extracts, from a web page corresponding to the page 210, a text related to each of the three images as a text summary of each image. For example, a text summary of an image 1 (namely, the image 211 in FIG. 2*b*) is "Athlete Xiao Ming is preparing for the game", a text summary of an image 2 (namely, the image 212 in FIG. 2*b*) is "After a goal, Xiao Jun sets a celebration posture", and a text summary of an image 3 (namely, the image 213 in FIG. 2*b*) is "The game ends, and the final score is 3:2". The web page analysis module 701 stores information such as identities and urls, and index data such as the text summaries of the three images into an index file.

For example, Table 1 shows some related fields of the index data corresponding to the web page in the index file.

TABLE 1

| Index field | Note | Example |
| --- | --- | --- |
| title | Web page title | Football cup 2020: Dramatic comeback 3:2 |
| img_seq | Main image mark on a web page | A first image (main image) on the web page, marked as 1 |

TABLE 1-continued

| Index field | Note | Example |
| --- | --- | --- |
| img_set | Whether an image collection is extracted from the web page | true |
| id | Image identity | 123abc |
| caption | Text summary related to an image | Athlete Xiao Ming is preparing for the game |
| img_url | Image address on an original web page | https://www.aaa.com/bbb.jpg |
| obs_url | Image address in an image host (obs bucket) | https://tysearch-image-dra.obs.com/a |
| set_imgs | Information about other images in an image collection, including ids, captions, img_urls, and obs_urls | [{<br>id: 456efg,<br>  caption: After a goal, Xiao Jun sets a celebration posture,<br>  img_url: https://www.ddd.com/bbb.jpg,<br>obs_url:https://tysearch-image-dra.obs.com/b<br>}, {<br>  id: 789xyz,<br>  caption: The game ends, and the final score is 3:2,<br>img_url:https://www.ccc.com/eee.jpg,<br>obs_url:https://tysearch-image-dra.obs.com/c<br>}] |

Table 1 shows content and a format of one piece of index data as an example. It may be learned that the piece of index data includes web page data and information about the three images in the web page data. The field "title" is a web page title, and the field provides retrieval data. When an index term and a web page title have an inclusion or inclusion relationship, the index data may be retrieved. The field "img_seq" is a main image mark on the web page. For the web page shown in FIG. 2b, a main image is the image 211, and may be used to display a first image in the image collection. The field "img_set" is used to identify whether the image collection is extracted from the web page. If the web page analysis module 701 extracts more than one image from the web page, img_set=true identifies that the image collection has been extracted from the web page, img_seq=1 indicates that the main image has been marked, and information about other images in the image collection is completely stored in the "set_imgs" field.

In some embodiments, the main image is determined based on the image aesthetic scoring algorithm. For example, an image with a highest image aesthetic score on the web page is the main image in the index data.

Optionally, the main image may be a first image on the web page.

Optionally, the main image may be an image on the web page set by the user.

In some embodiments, the text summary of the image may also be used as a retrieval field. For example, the "caption" field in Table 1 may also be used as a retrieval field.

In some embodiments, one web page may have a plurality of pieces of index data, for example, index data created by using the image 212 as a main image or using the image 213 as a main image.

In some embodiments, the format of the index data shown in Table 1 is an example structure, and does not constitute a limitation on the format of the index data in embodiments of this application.

In some embodiments, an aesthetic scoring rule or a quality scoring rule of the web page analysis module 701 for the image may change based on a change of a scenario type of image content. For example, an image feature is a Danxia landform, and a weight of a color brightness degree and a terrain hierarchy may be increased or added to the aesthetic scoring rule or the quality scoring rule; an image feature is a road, and a weight of a proportion of water, an island, and a sky may be increased or added to the aesthetic scoring rule or the quality scoring rule; or an image feature is an elevated road, and a weight of a light brightness degree and a proportion of a sky and a tall building may be increased or added to the aesthetic scoring rule or the quality scoring rule. In this way, the aesthetic scoring rule or the quality scoring rule is customized based on accurate scenario classification, so that quality of a selected image can be improved, and user experience is improved.

In some embodiments, a text summary corresponding to each image is not limited to extracting a related text on the web page. The web page analysis module 701 may further identify a scenario, an entity, and an event in the image based on a semantic understanding of the image, convert semantics of the image into a text description as the text summary of the image.

In some embodiments, the web page analysis module 701 may perform web page analysis in an offline state.

In some embodiments, images on a plurality of web pages may be extracted as images in a same image collection. The plurality of web pages may be, for example, web pages with a same web page title, or web pages from a same site. For example, a long report is divided into several pages or previous and next pages for display. The electronic device 100 may identify an association relationship between these web pages. Although website addresses are different, the electronic device 100 may also extract images on these web pages as images in the same image collection.

The query and display module 702 is configured to receive a query request for the index term, query the index term based on the index data, and return a query result to the front end for display.

The user enters the index term to initiate the query request. After receiving the query request, the query and display module 702 performs processing such as word segmentation and intention determining on the index term, queries data related to the index term in the index file, sorts results based on correlation or quality dimensions, and finally returns a sorted result to a front-end application (for example, a search engine). The data that is related to the index term and that is queried by the query and display module 702 includes the determined index data in the web page analysis module 701, that is, includes web page information, an image id on the web page, the original image URL, the OBS bucket image URL, the text summaries related to the images, and the like. The query and display module 702 feeds back the information to the front-end application, and the front-end application may obtain an image thumbnail from the image host (namely, the obs bucket) by using the obs bucket image URL and display the image thumbnail. After the user clicks the thumbnail to enter a details page, the front-end application may obtain an original image based on the original image URL and display the image.

Figure 9:
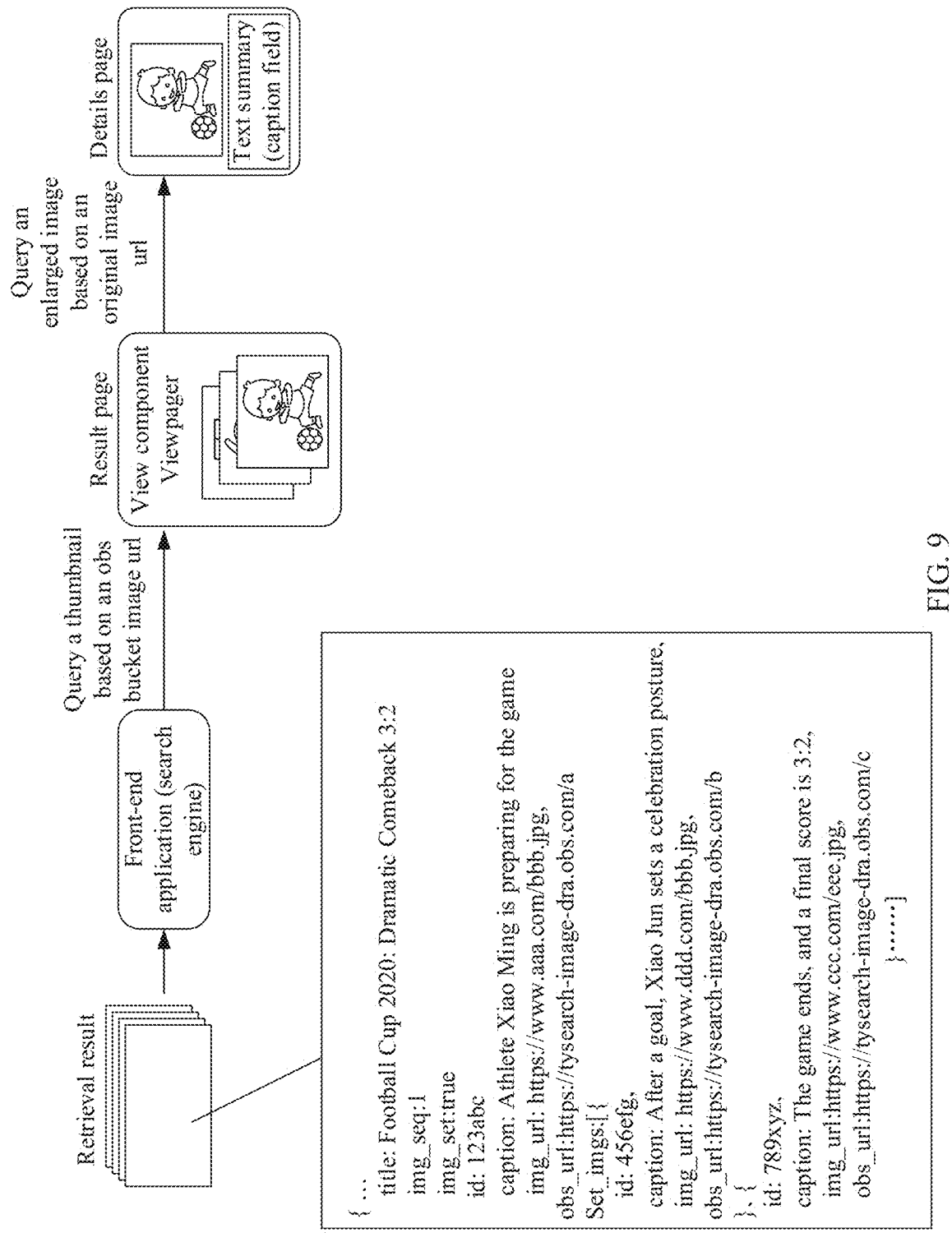
FIG. 9 is a schematic diagram of a principle of an image search method according to an embodiment of this application.

For example, as shown in FIG. 9, the user enters an index term "football cup" in an image search engine (front-end application). It is known that the title of the web page shown in FIG. 2b includes "football cup". The query and display module 702 queries, based on the index file (including index data shown in Table 1), that the title of the web page includes "football cup", and the query and display module 702 determines that the query result includes index data corresponding to the web page. The piece of index data indicates that the image collection has been extracted from the web page (img_set=true), the main image is marked (img_seq=1), and information about other images in the image collection is completely stored in the set_imgs field. This indicates that the piece of data is displayed on a search result page in a form of an image collection. Optionally, the query and display module 702 may rank the piece of index data to the top of search results according to a preset sorting rule. The preset sorting rule includes consideration of factors such as image correlation, image collection correlation, and the like. For example, an image with strong correlation is displayed before an image with weak correlation.

The query and display module 702 returns the query result to the front-end application. The query result includes one or more pieces of index data, and each piece of index data may correspond to one or more images (image collections). For example, the index data received by the front-end application includes the index data shown in Table 1. The front-end application obtains thumbnails of the three images from the image host by using obs bucket image url data, and displays the thumbnails on the search result page. An example of display effect is shown in FIG. 5a. In FIG. 5a, an image display area corresponding to an image 505 is marked with an image collection identifier 508, indicating that a web page image collection is displayed in this location. By using a view component ViewPager (namely, the image display area corresponding to the image 505 shown in FIG. 5a) in the front-end application, the user may slide the thumbnail leftward or rightward or click a left or right control to browse the three images.

When clicking any one of the three thumbnails, the user may enter a details page and browse a corresponding enlarged image (obtained from an original web page by using img_url). An example of display effect is shown in FIG. 6a to FIG. 6c. Below each enlarged image, the text summary and the web page title related to the image extracted from web page analysis are displayed.

In this embodiment of this application, the server performs image analysis on a large quantity of web pages, determines index data of the web pages, and stores the index data into the index file. The index file is used to provide index data required by the user. The electronic device 100 receives a query instruction. The query instruction indicates the electronic device 100 to search for the index term. In response to the query instruction, the electronic device 100 sends a query request to the server. The query request is used to request to search for the index term. The server queries the index term based on the index file, and sends a query result to the electronic device 100. The electronic device 100 displays a result page for the index term based on the obtained query result.

In some embodiments, the web page analysis module 701 and the query and display module 702 may be integrated on a same device, for example, the server or the electronic device 100.

Figure 10:
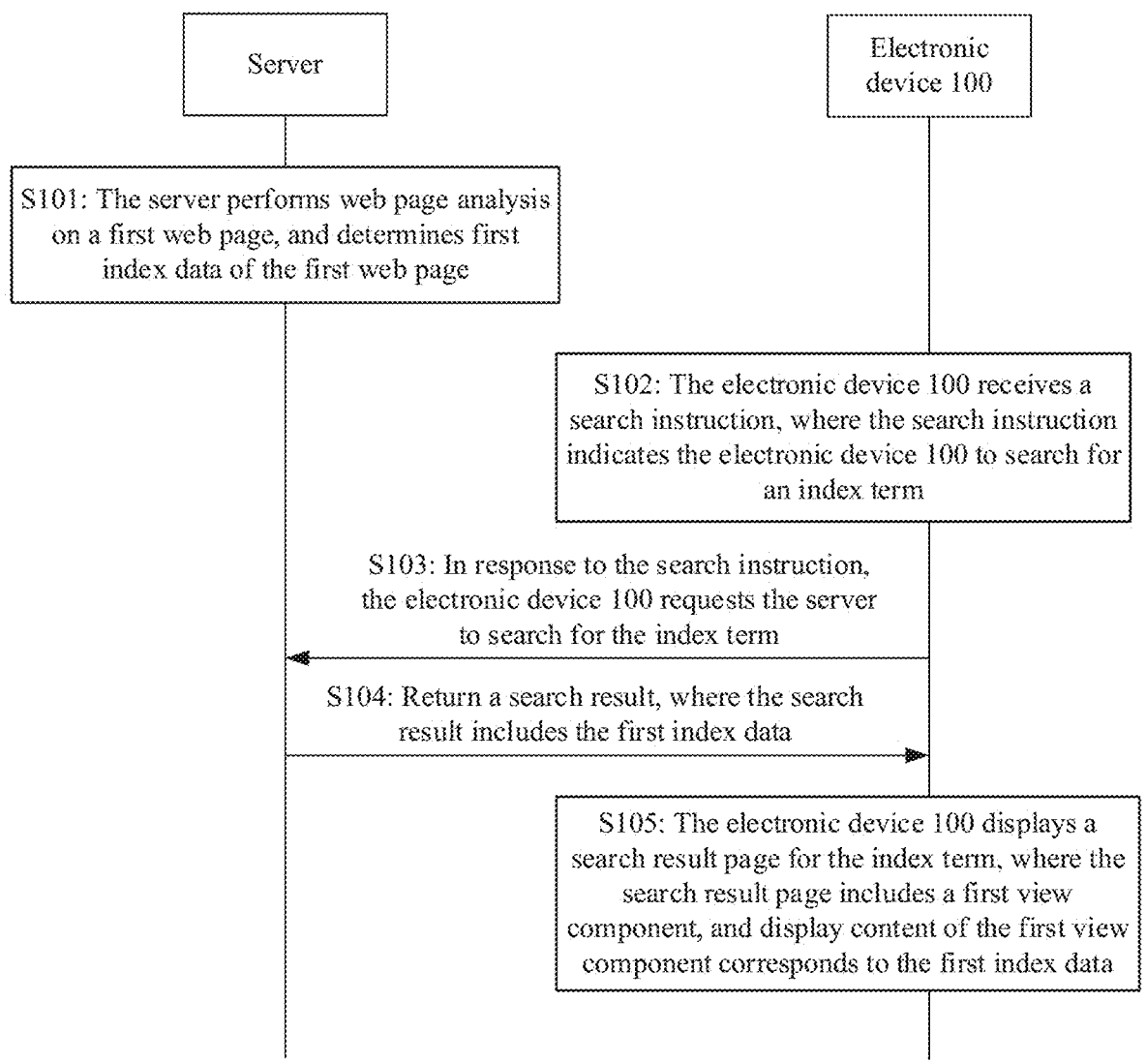
FIG. 10 is a flowchart of steps of an image search method according to an embodiment of this application.

The following describes in detail a procedure of steps of an image search method provided in this application. FIG. 10 is an example of a flowchart of steps of an image search method. The method may include:

S101: A server performs web page analysis on a first web page, and determines first index data of the first web page.

Before performing image search, the server may perform image analysis on a large quantity of web pages, determine index data of the web pages, and store the index data into an index file. The index file is used to provide index data required by a user.

For example, the server performs web page analysis on the first web page. The first web page includes at least two images. For example, for the first web page, refer to the web page 210 shown in FIG. 2b. The first index data includes related data of the at least two images on the first web page, and thumbnails of two images in the at least two images of the first index data are respectively a first thumbnail and a second thumbnail.

First, the server determines images that meet a preset condition and that are on the first web page. The preset condition may be that an image quality score calculated based on an image quality scoring algorithm is greater than a second threshold; an image aesthetic score calculated based on an image aesthetic scoring algorithm is greater than a third threshold; a correlation coefficient between an image and web page content based on image-text correlation analysis is greater than a fourth threshold; and/or the like.

Herein, the server performs screening on the images on the first web page, and may screen out an image that is not related to the web page content, for example, an advertisement image or a pop-up window image on the web page, or may screen out an image of low image quality, for example, an unclear image. In other words, not all images on a web page are extracted as an image collection. The server needs to perform selective extraction in full combination with image quality/aesthetic evaluation, image correlation analysis, and the like. In this way, image quality may be improved, and search experience of the user is improved.

Then, the server uses the images that meet the condition as an image collection of the first web page, stores related information of the images in the image collection as one piece of index data, and stores the index data into an index file. When retrieving the piece of index data based on a received index term, the server may provide images in an image collection. All the images in the image collection are from the first web page, and have association and storytelling. The server stores the index data (which is also referred to as the first index data) of the first web page into the index file for subsequent image search.

Optionally, the index data may include a website address of the first web page, a web page title of the first web page, an identity of each of the images extracted from the first web page, an original image URL, an OBS bucket image URL, text summaries related to the images, and the like. The server may search for other data in the index data based on any piece of data in the index data. For specific descriptions of the index data, refer to related descriptions in Table 1. Details are not described herein again.

Optionally, the index data includes main image data. The main image data is used to present a first image in the image collection. When the index data includes image data of more than one image, an image with a highest image aesthetic score may be a main image in the index data, a first image in the index data is a main image, or the like.

In some embodiments, before performing web page analysis on the first web page, the server screens a web page on which image analysis needs to be performed. For example, a screening condition may be that the web page needs to be a preset site web page (a formal web page or an authoritative web page), the web page needs to include an image, or the like. In other words, image analysis is not performed on and an image collection is not extracted from all web pages. The server screens the web page, so that resource waste is avoided and quality of search results is improved.

S102: An electronic device 100 receives a search instruction, where the search instruction indicates the electronic device 100 to search for an index term.

The user enters an index term in an application program (for example, a search engine), and the electronic device 100 receives a search instruction for the index term. The search instruction may be, for example, a user operation of clicking a search control, or a voice instruction for confirming a search.

The index term may be determined by the electronic device 100 by performing text recognition based on a received text input by the user, may be determined by the electronic device 100 by performing voice recognition based on a received voice input by the user, may be determined by the electronic device 100 by performing image recognition based on a received image and determining an image feature, or the like.

S103: In response to the search instruction, the electronic device 100 requests the server to search for the index term.

S104: The server returns a search result to the electronic device 100, where the search result includes the first index data.

The electronic device 100 searches for the index term based on the index file, finds one or more pieces of index data related to the index term in the index file, and returns a search result (including the one or more pieces of index data) to the electronic device 100. A related definition may be that the index term has an including or included relationship with any field in the index data. The one or more pieces of index data include the first index data.

The index data shown in Table 1 is used as an example. The index data shown in Table 1 includes data, for example, a web page title (Football Cup 2020: Dramatic Comeback 3:2) and text summaries (the athlete Xiao Ming is preparing for the game; after a goal, Xiao Jun sets a celebration posture; and the game ends, and a final score is 3:2). When the index term includes texts, for example, the football cup, Xiao Ming, Xiao Jun, and the score 3:2, the electronic device 100 may retrieve the piece of index data.

The server searches for the index term, queries the one or more pieces of index data related to the index term based on the index file, and invokes a display element of each piece of index data based on the queried one or more pieces of index data, for example, including an image thumbnail and a text summary of an image. The index data includes an original image url (used to obtain an original enlarged image of the image), an obs bucket image url (used to obtain the image thumbnail), and the text summary of the image.

S105: The electronic device 100 displays a search result page for the index term, where the search result page includes a first view component, and display content of the first view component corresponds to the first index data.

The electronic device 100 displays the search result page. The search result page includes one or more display areas (which are also referred to as view components), and each display area displays an image thumbnail corresponding to one piece of index data. A first display area (which is also referred to as a first view component) displays an image thumbnail corresponding to the first index data. The first index data includes data of at least two images. The first display area may display thumbnails of the at least two images, and a display form of the first display area is not limited. For example, in some embodiments, the thumbnails of the at least two images are displayed in parallel in the first display area.

In some embodiments, a thumbnail of one image is displayed in the first display area. When receiving a user operation (which may also be referred to as a first switching instruction) for the first display area, the electronic device 100 switches a first thumbnail currently being displayed in the first display area to a second thumbnail. Herein, refer to the user interfaces shown in FIG. 5*a* to FIG. 5*c*. The first display area is a display area occupied by the image 505 in FIG. 2*a*. When receiving a user operation for the control 509 in FIG. 5*a*, the electronic device 100 switches the image 505 displayed in the first display area to an image 511. When receiving a user operation for the control 509 in FIG. 5*b*, the electronic device 100 switches the image 511 displayed in the first display area to an image 521.

In some embodiments, the search result page further includes a second view component (a second display area), and the second view component is configured to display one thumbnail. In other words, the second view component displays an image thumbnail corresponding to second index data, and the second index data includes data of one image.

In some embodiments, the first display area includes an image collection identifier, and the image collection identifier indicates that the first display area includes the at least two images. Optionally, the first display area includes a next image control and a previous image control that are used to switch to view another image. Optionally, the user may slide leftward or rightward in the first display area, to switch to view a next image or a previous image.

An image switching manner is not limited to the foregoing shown image switching manner implemented based on the user operation. In this embodiment of this application, image switching may alternatively be implemented in another manner. For example, the electronic device 100 automatically switches an image in an image collection.

Optionally, the electronic device 100 displays the search result page. The search result page includes the first display area, and the first display area displays the image thumbnail corresponding to the first index data. Because the first index data includes the data of the at least two images, the electronic device 100 displays a thumbnail (which is also referred to as the first thumbnail) of one of the images in the first display area, and switches the thumbnail displayed in the first display area at an interval of a preset time. For example, when continuous display time of the first thumbnail in the first display area reaches a first threshold, the electronic device 100 switches the first thumbnail that is being displayed in the first display area to the second thumbnail. Optionally, the electronic device 100 displays the second thumbnail in the first display area. When continuous display time of the second thumbnail in the first display area reaches the first threshold, the electronic device 100 switches the second thumbnail that is being displayed in the first display area to a third thumbnail. Optionally, if the second thumbnail is a last image in the first index data, when continuous display time of the second thumbnail in the first display area reaches the first threshold, the electronic device 100 switches the second thumbnail that is being displayed in the first display area to the first thumbnail, and sequentially and cyclically performs switching.

Optionally, the search result page includes the first display area, and the first thumbnail is displayed in the first display area. When detecting that dwell time of the search result page reaches the first threshold, the electronic device 100 switches the first thumbnail that is being displayed in the first display area to the second thumbnail. Optionally, the electronic device 100 displays the second thumbnail in the first display area. When detecting that the dwell time of the search result page reaches the first threshold, the electronic device 100 switches the second thumbnail that is being displayed in the first display area to the third thumbnail. Optionally, if the second thumbnail is the last image in the first index data, when detecting that the dwell time of the search result page reaches the first threshold, the electronic device 100 switches the second thumbnail that is being displayed in the first display area to the first thumbnail, and sequentially and cyclically performs switching.

In some embodiments, the first index data includes main image data, and the main image data is used to determine a first image displayed in the first display area. The electronic device 100 displays a thumbnail of a main image in the first display area based on the first index data. When receiving an image switching operation for the first display area, the electronic device 100 switches the thumbnail of the main image in the first display area to a next thumbnail.

In some embodiments, the user may further view an original image of a thumbnail in the first display area. When receiving a user operation for the first thumbnail, the electronic device 100 displays an original image of the first thumbnail. Herein, refer to the user interface shown in FIG. 6a. If the first thumbnail is the image 505 in FIG. 5a, the original image corresponding to the first thumbnail is the image displayed in FIG. 6a. When receiving an image switching instruction (which may also be referred to as a second switching instruction) for the original image of the first thumbnail, the electronic device 100 displays an original image of the second thumbnail.

Optionally, the first index data includes the text summary of the image, and the text summary of the image may be displayed together with the original image.

In this embodiment of this application, the electronic device 100 needs to analyze a large quantity of web pages, extract and determine index data of a related image on the web page, and establish the index file. Based on correlation between an image and a text included in the web page, image quality, an image aesthetic feature, and the like, the electronic device 100 extracts some or all images on the web page as an image collection of the web page, and determines a text summary of each image in the image collection. The electronic device 100 generates index data of the web page based on the image, the text summary, and the like extracted from the web page. When receiving the index term entered by the user, and retrieving that the index term is related to the index data of the web page, the electronic device 100 displays, on the search result page, an image collection corresponding to the piece of index data, that is, the user may view all images related to the index term on the web page. In this way, in a manner in which the electronic device 100 displays images on a single web page in a form of an image collection on the search result page, association and storytelling between images on a source web page of the image collection are maintained, and the search experience of the user is improved.

In some embodiments, step S101 may also be performed by the electronic device 100. The electronic device 100 may perform image analysis on a large quantity of web pages, determine index data of the web pages, and store the index data into an index file. The index file is used to provide index data required by the user. That is, the electronic device 100 performs web page analysis on the first web page, to determine the first index data of the first web page.

The electronic device 100 receives a search instruction, where the search instruction indicates the electronic device 100 to search for the index term. In response to the search instruction, the electronic device 100 searches for the index term based on the index file, and the electronic device 100 determines one or more pieces of index data (including the first index data). The electronic device 100 displays a search result page for the index term. The search result page includes one or more view components, and display content of the first view component in the one or more view components corresponds to the first index data.

All or some of the foregoing embodiments may be implemented by software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some procedures or functions in embodiments of this application are generated. The computer may be a general-purpose computer, a dedicated computer, a computer network, or another programmable apparatus. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive), or the like.

A person of ordinary skill in the art may understand that all or some of the procedures of the methods in the foregoing embodiments may be implemented by a computer program instructing related hardware. The program may be stored in the computer-readable storage medium. When the program is executed, the procedures in the foregoing method embodiments may be performed. The foregoing storage medium includes any medium that can store program code, such as a ROM, a random access memory RAM, a magnetic disk, or an optical disc.

The invention claimed is:

1. A method applied to an electronic device, wherein the method comprises:
   receiving a search instruction, wherein the search instruction instructs the electronic device to search for an index term, wherein the index term is related to first index data;
   obtaining a first message from a server in response to the search instruction, wherein the first message comprises the first index data, wherein the first index data is based on a web page analysis on a first web page, wherein the first index data comprises related data of at least two images that are extracted from the first web page and that meet a preset condition, and wherein thumbnails of two images in the at least two images are respectively a first thumbnail and a second thumbnail;
   displaying a search result page for the index term in response to the search instruction, wherein the search result page comprises a first view component;
   displaying content of the first view component that corresponds to the first index data, wherein the first view component comprises the first thumbnail;
   receiving, on the first view component, a first switching instruction; and
   switching, in response to receiving the first switching instruction, the first thumbnail to a second thumbnail,
   wherein both a first original image corresponding to the first thumbnail and a second original image corresponding to the second thumbnail are from the first web page.

2. The method of claim 1, wherein the first view component comprises an image collection identifier, and wherein the image collection identifier indicates that the first view component displays at least two thumbnails.

3. The method of claim 1, wherein the search result page further comprises a second view component displaying one thumbnail.

4. The method of claim 1, further comprising:
   detecting that either a dwell time on the search result page or that a continuous display time of the first thumbnail exceeds a first threshold; and
   switching, in response to the detecting, the first thumbnail to the second thumbnail.

5. The method of claim 1, further comprising:
   receiving a user operation for the first thumbnail; and
   displaying a first details page of the first thumbnail in response to the user operation, wherein the first details page comprises the first original image and a text summary.

6. The method of claim 5, further comprising extracting the text summary from text content on the first web page based on an image-text correlation analysis.

7. The method of claim 5, further comprising:
   receiving, on the first details page, a second switching instruction; and
   displaying a second details page of the second thumbnail in response to the second switching instruction.

8. The method of claim 1, wherein a first quantity of images on the first web page is greater than a second quantity of images that are in the first index data and that are used for display.

9. The method of claim 1, wherein the preset condition comprises at least one of:
   an image quality score of an image is greater than a second threshold;
   an image aesthetic score of the image is greater than a third threshold; or an image-text feature correlation of the image is greater than a fourth threshold.

10. The method of claim 9, wherein the image aesthetic score is based on a scoring weight of an image aesthetic scoring algorithm associated with a scenario type of the image.

11. The method of claim 1, wherein the first index data comprises one or more pieces of the following data: a web page address of the first web page, a web page title of the first web page, addresses on the first web page of the at least two images that meet the preset condition, thumbnail addresses of the at least two images, identities of the at least two images, or text summaries of the at least two images.

12. An electronic device, comprising:
   a memory configured to store instructions; and
   one or more processors coupled to the memory and configured to execute the instructions to cause the electronic device to:
     receive a search instruction, wherein the search instruction instructs the electronic device to search for an index term, wherein the index term is related to first index data;
     obtain a first message from a server in response to the search instruction, wherein the first message comprises the first index data, wherein the first index data is based on a web page analysis on a first web page, wherein the first index data comprises related data of at least two images that are extracted from the first web page and that meet a preset condition, and wherein thumbnails of two images in the at least two images are respectively a first thumbnail and a second thumbnail;
     display a search result page for the index term in response to the search instruction, wherein the search result page comprises a first view component;
     display content of the first view component that corresponds to the first index data, wherein the first view component comprises the first thumbnail;
     receive, on the first view component, a first switching instruction; and
     switch, in response to receiving the first switching instruction, the first thumbnail displayed in the first view component to a second thumbnail, and
     wherein both a first original image corresponding to the first thumbnail and a second original image corresponding to the second thumbnail are from a first web page.

13. A non-transitory computer-readable medium configured to store one or more programs that, when executed by one or more processors, cause an electronic device to:
   receive a search instruction, wherein the search instruction instructs the electronic device to search for an index term, wherein the index term is related to first index data;
   obtain a first message from a server in response to the search instruction, wherein the first message comprises the first index data, wherein the first index data is based on a web page analysis on a first web page, wherein the first index data comprises related data of at least two images that are extracted from the first web page and that meet a preset condition, and wherein thumbnails of two images in the at least two images are respectively a first thumbnail and a second thumbnail;
   display a search result page for the index term in response to the search instruction, wherein the search result page comprises a first view component;
   display content of the first view component that corresponds to the first index data, wherein the first view component comprises the first thumbnail;

receive, on the first view component, a first switching instruction; and switch, in response to receiving the first switching instruction, the first thumbnail displayed in the first view component to a second thumbnail, wherein both a first original image corresponding to the first thumbnail and a second original image corresponding to the second thumbnail are from a first web page.

14. The electronic device of claim 12, wherein the first view component comprises an image collection identifier, and wherein the image collection identifier indicates that the first view component displays at least two thumbnails.

15. The electronic device of claim 12, wherein the search result page further comprises a second view component displaying one thumbnail.

16. The electronic device of claim 12, wherein the one or more processors are further configured to execute the instructions to cause the electronic device to:

detect that either dwell time on the search result page or that continuous display time of the first thumbnail exceeds a first threshold; and switch, in response to the detecting, the first thumbnail displayed in the first view component to the second thumbnail.

17. The electronic device of claim 12, wherein the one or more processors are further configured to execute the instructions to cause the electronic device to:

receive a user operation for the first thumbnail; and display a first details page of the first thumbnail in response to the user operation, wherein the first details page comprises the first original image and a text summary.

18. The electronic device of claim 17, wherein the one or more processors are further configured to execute the instructions to cause the electronic device to extract the text summary from text content on the first web page based on image-text correlation analysis.

19. The electronic device of claim 17, wherein the one or more processors are further configured to execute the instructions to cause the electronic device to:

receive, on the first details page, a second switching instruction; and display a second details page of the second thumbnail in response to the second switching instruction.

20. The electronic device of claim 12, wherein a first quantity of images on the first web page is greater than a second quantity of images that are in the first index data and that are used for display.

* * * * *